United States Patent
Peterson

(10) Patent No.: US 10,893,122 B2
(45) Date of Patent: Jan. 12, 2021

(54) METHODS AND SYSTEMS FOR DETERMINING USER RECOVERY TIMES TO REAL-LIFE EVENT

(71) Applicant: Rovi Guides, Inc., San Carlos, CA (US)

(72) Inventor: Brian C. Peterson, Barrington, IL (US)

(73) Assignee: Rovi Guides, Inc., San Jose, CA (US)

( * ) Notice: Subject to any disclaimer, the term of this patent is extended or adjusted under 35 U.S.C. 154(b) by 467 days.

(21) Appl. No.: 15/086,511

(22) Filed: Mar. 31, 2016

(65) Prior Publication Data

US 2017/0286528 A1    Oct. 5, 2017

(51) Int. Cl.
*G06Q 50/00*    (2012.01)
*H04L 29/08*    (2006.01)

(52) U.S. Cl.
CPC ........... *H04L 67/306* (2013.01); *G06Q 50/01* (2013.01); *H04L 67/22* (2013.01)

(58) Field of Classification Search
CPC .................................................... H04L 67/306
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,761,892 B2 | 7/2010 | Ellis et al. |
| 8,046,801 B2 | 10/2011 | Ellis et al. |
| 2004/0013409 A1 | 1/2004 | Beach |
| 2005/0251827 A1 | 11/2005 | Ellis et al. |
| 2006/0117351 A1 | 6/2006 | Sanders |
| 2008/0148322 A1 | 6/2008 | Howcroft |
| 2010/0153885 A1 | 6/2010 | Yates |
| 2010/0287033 A1 | 11/2010 | Mathur |
| 2011/0246937 A1 | 10/2011 | Roberts |
| 2012/0016817 A1 | 1/2012 | Smith et al. |
| 2012/0136866 A1 | 5/2012 | Carter et al. |
| 2013/0111527 A1 | 5/2013 | Poniatowski |
| 2013/0159132 A1 | 6/2013 | Adams |
| 2014/0189524 A1 | 7/2014 | Murarka |
| 2015/0181289 A1 | 6/2015 | Wheatley |
| 2015/0234820 A1 | 8/2015 | Aravamudan |
| 2017/0091628 A1 | 3/2017 | Nachman |
| 2017/0286424 A1 | 10/2017 | Peterson |
| 2017/0286528 A1 | 10/2017 | Peterson |
| 2017/0324987 A1 | 11/2017 | Tseng |

*Primary Examiner* — Hau H Hoang
(74) *Attorney, Agent, or Firm* — Haley Guiliano LLP

(57) ABSTRACT

A media guidance application may determine user recovery times to real-life events. For example, the media guidance application may track the length of time that a particular user takes to recover from various real-life events.

20 Claims, 10 Drawing Sheets

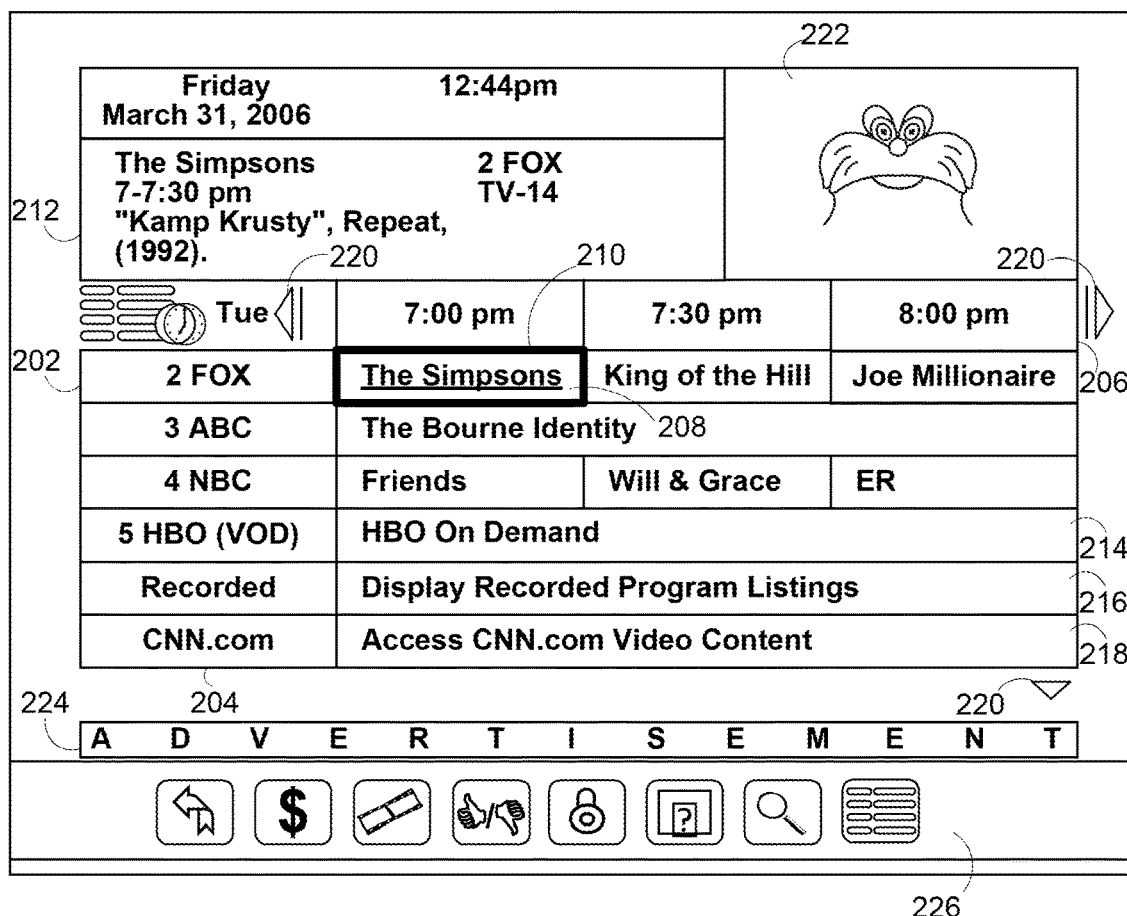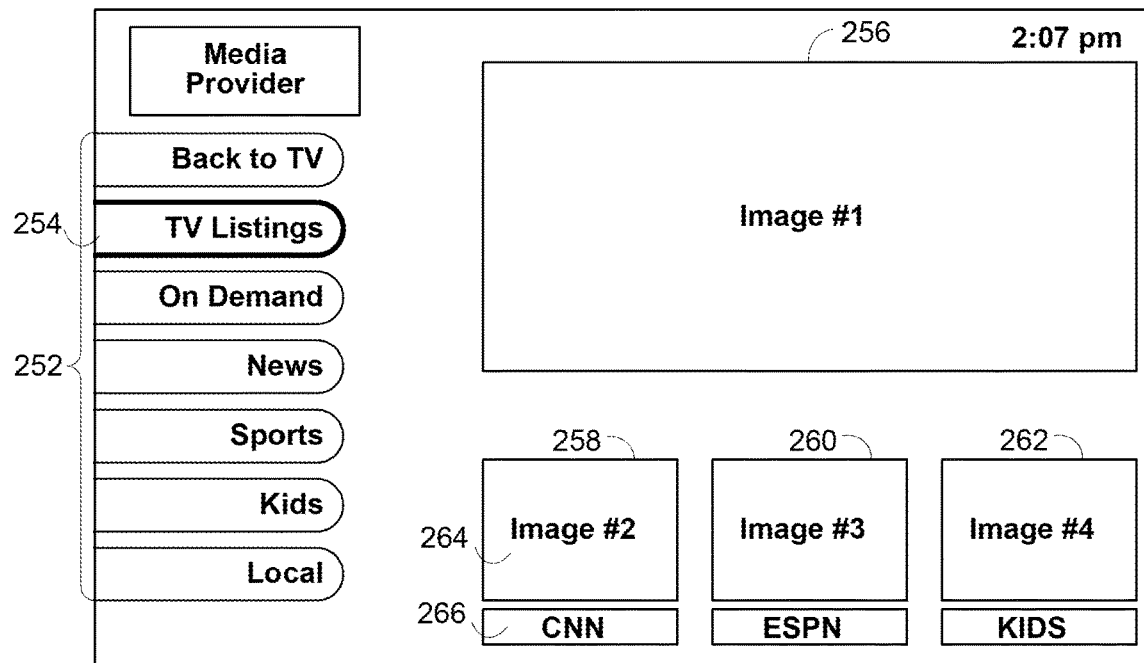
FIG. 2

900

900 ...
901 Initialization Subroutine
902 ...
903 //Routine to modify user profile based on user profile modification:
904
905 Receive next criteria in user profile modification
906 For each criteria in user profile modification:
907     Query database containing criteria of user profile for entries matching criteria in user profile modification
908         If (Number of matching entries > 0)
909             Retrieve value of criteria from database entries matching user profile modification
910             Execute Subroutine to update criteria in user profile with criteria in user profile modification using control circuitry
911 ...
912 Termination Subroutine
913 ...

1100 ...
1101 Initialization Subroutine
1102 ...
1103 //Routine to parse data:
1104
1105 Receive next word
1106 For each instance of next word:
1107    Query database containing keywords for entries matching next word
1108       If (Number of matching entries > 0)
1109          Retrieve value of user profile modification from database entries matching next word
1110          Execute Subroutine to update user profile with user profile modification using control circuitry
1111 ...
1112 Termination Subroutine
1113 ...

FIG. 11

METHODS AND SYSTEMS FOR DETERMINING USER RECOVERY TIMES TO REAL-LIFE EVENT

BACKGROUND

In conventional media systems, the interactions of a user with media content may be tracked. For example, a content provider may identify the programs a user has watched and recommend similar programs to the user. Likewise, the content provider may provide targeted advertisements (e.g., advertisements targeted to a user based on the interests, demographics, etc., of the user) to the user. While such "user profiling" may aid content providers in providing content customized for the users, such profiling has its limitations.

Specifically, the user profile may contain incorrect data, and thus provide incorrect content recommendations. For example, the content provider may have erroneously associated the viewing of a program with the wrong user (e.g., a different user may have watched content while a device was associated with the user), the user profile may contain out-of-date information (e.g., the tastes of the user may have changed), and/or the criteria used to classify programs, and/or the criteria that a program meets in the user profile may have changed (e.g., the genre classification of a program a user views has changed from "horror" to "comedy").

SUMMARY

Accordingly, methods and systems are described herein for a media guidance application that addresses the aforementioned problems currently afflicting user profiling. Specifically, the media guidance application may take measures to verify user profile data and to subsequently filter out incorrect data; thus, the recommendations and targeting provided by the user profile do not feature the problems expressed above. For example, the media guidance application may verify the user profile data based on the occurrence and/or re-occurrence of real-life events. Moreover, user profile data may be associated with specific lengths of time (e.g., a length of time that the stored user profile data may remain in and/or affect recommendations based on the user profile).

By associating user profile data with real-life events, the media guidance application may determine that user interactions that produce user profile data that is inconsistent with other user profile data (e.g., interactions produced with a different user were associated with the user profile) should not be stored in the user profile, should be weighted less heavily, etc. Accordingly, the media guidance application produces a more accurate user profile based on more precise data than traditional systems.

Additionally or alternatively, by associating user profile data with lengths of time, the media guidance application may determine that user profile data that is inconsistent with more recently generated user profile data (e.g., out-of-date user profile data) should be filtered out of the user profile.

Accordingly, the media guidance application produces a more up-to-date user profile based on more up-to-date data than traditional systems.

Additionally or alternatively, the media guidance application may monitor for patterns of consistency/inconsistency in user profile data. For example, the media guidance application may predict when the tastes of a user may change (e.g., current user profile data begins to become inconsistent with older user profile data) based on a historical analysis of trends found in the user profile data. For example, if the media guidance application determines that a user typically modifies his or her tastes (e.g., current user profile data begins to become inconsistent with older user profile data) every month, the media guidance application may associate received user profile data with a month-long shelf life. When the shelf life expires (e.g., a month has passed since the user profile data was generated), the media guidance application may automatically delete the user profile data, de-emphasize the user profile data (e.g., via weighing the information less than more recently generated user profile data), etc. Accordingly, the media guidance application may institute a self-cleaning or self-correcting system in contrast to traditional systems.

In some aspects, the media guidance application may determine how long to modify user profiles based on real-life events. For example, in order to keep user profiles up-to-date (e.g., to reflect temporary changes to the tastes of a user), the media guidance application may temporarily change the criteria for recommending content based on real-life events. For example, in response to detecting that a user has recently experienced a traumatic automobile crash, the media guidance application may temporarily prevent recommendations for content featuring cars, car crashes, traumatic events, etc., to the user. After a given period of time (e.g., correlating to a recovery time from the traumatic event), the media guidance application may once again provide recommendations that may feature the previously prevent content.

The media guidance application may retrieve social media data indicative of a current real-life event of a user. For example, to determine current real-life events of users that may trigger a user profile modification, the media guidance application may retrieve various sources of current information about the user such as data retrieved from a social media site. Such information may include status updates provided by the user or third parties that have a relationship to the user (e.g., a social network "friend" and/or social network contact of the user).

The media guidance application may parse the social media data to identify a keyword corresponding to the current real-life event. For example, the media application may use multiple types of optical character recognition and/or fuzzy logic, for example, when processing keyword(s) retrieved from social media data (e.g., textual data, translated audio data, user inputs, etc.). For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical. Moreover, the media guidance application may detect the relationship (e.g., the frequency of use, proximity of user, etc.) of one word to another in order to determine a context of the words. For example, if the media guidance application identifies the word "crash" next to, or in close proximity to, "car," the media guidance application may identify a keyword as "car crash." Using one or more of the aforementioned techniques, the media guidance application may identify keywords in the social media data.

The media guidance application may input the keyword into a database listing user profile modifications associated with keywords corresponding to current real-life events. For example, the media guidance application may access a locally or remotely stored database of keywords that relate to different current real-life events, which may be populated with predetermined keyword relationships from a plurality of sources. For example, the word "break-up," may relate to a user profile modification to change a criterion for favorite genre from "romantic comedy," which may remind a user of a recent break-up with a boyfriend, to "action," which will not remind the user of the break-up. In another example, the word "break-up," may relate to a user profile modification to increase/decrease a weight attributed to a particular criterion (e.g., genre), as the favorite genre of the user is "romantic comedy," which may remind the user of the recent break-up. Accordingly, other criteria in the user profile (e.g., favorite actor, preferred play length, etc.) may have more weight attributed to them, as content corresponding to the other criteria is less likely to remind the user of the recent break-up.

The media guidance application may identify a user profile modification corresponding to the keyword from the database listing user profile modifications associated with keywords corresponding to current real-life events based on a comparison of the keyword to the keywords corresponding to current real-life events. For example, the database may be structured as a look-up table database. The media guidance application may input the identified keyword into the look-up table database and filter or sort the keywords in the database based on a relevancy of the keywords in the database (e.g., the degree to which the inputted keywords matches one or more of the keywords in the database). Upon identifying a keyword from the database that matches the inputted keyword, the media guidance application may locate a user profile modification (e.g., one or more criteria modifications) corresponding to the identified keyword (e.g., user profile modifications located in a field of the database associated with the identified keyword).

The media guidance application may input the user profile modification into a database listing average time periods corresponding to various user profile modifications. For example, the media guidance application may access a locally or remotely stored database of keywords that relate to different time periods for which particular user profile modifications should be applied to a given user profile. The time periods may be determined based on data received from third parties (e.g., factory defaults, user surveys, industry standards, etc.) and/or past user history with regard to real-life events. For example, the database may indicate that "break-ups" correspond to a month-long user profile modification time period, whereas "family death" corresponds to a year-long user profile modification time period.

The media guidance application may identify a time period corresponding to the user profile modification from the database listing average time periods corresponding to various user profile modifications based on a comparison of the user profile modification to the various user profile modifications. For example, the database may also be structured as a look-up table database. The media guidance application may input the user profile modification into the look-up table database and filter or sort the keywords in the database based on a relevancy of the user profile modification in the database (e.g., the degree to which the inputted user profile modification matches one or more of the user profile modifications in the database). Upon identifying a user profile modification from the database that matches the inputted user profile modification, the media guidance application may locate an average time period corresponding to the identified user profile modification (e.g., a time period located in a field of the database associated with the identified keyword).

The media guidance application may apply the user profile modification to a user profile of the user for the time period. For example, if the media guidance application determines that the user profile modification corresponds to presenting only media assets with short play lengths and that that user profile modification corresponds to a year-long time period, the media guidance application may only recommend media assets with a short play length for the next year.

In some embodiments, the media guidance application may apply user profile modifications by adjusting criteria (and/or the weight attributed to the criteria) in a user profile. For example, the media guidance application may apply a user profile modification that indicates that a user no longer prefers media assets of the "horror" genre by modifying the "favorite genre" in a user profile. Alternatively or additionally, the media guidance application may apply user profile modifications, which may constitute individual changes to particular criteria, by adjusting the criteria, or the weight attributed to criteria, in the user profile. For example, the user profile may include a first criterion and a second criterion for selecting media assets for presentation to the user, wherein the first criterion corresponds to a first weight and the second criterion corresponds to a second weight. When applying the user profile modification to the user profile of the user for the time period, the media guidance application may determine the user profile modification corresponds to increasing the first weight corresponding to the first criterion in the user profile and increase the first weight corresponding to the first criterion in the user profile.

In some embodiments, the media guidance application may identify a relationship strength of the user profile modification and the keyword based on a relationship strength rating retrieved from the database listing user profile modifications associated with keywords corresponding to current real-life events and adjust a weight of the user profile modification based on the relationship strength of the user profile modification. For example, the media guidance application may apply user profile modifications based on how likely a particular keyword is to be indicative of the current real-life event actually occurring. The media guidance application may quantify this likelihood through a relationship strength rating. The relationship strength rating may be retrieved from a database, stored locally or remotely, and populated from third-party or user-specific data, listing relationship strength ratings corresponding to various keyword real-life event relationships. For example, the database may also be structured as a look-up table database. The media guidance application may input the keyword real-life event relationship into the look-up table database and filter or sort the keyword real-life event relationships in the database based on a relevancy of the real-life event relationship in the database (e.g., the degree to which the inputted keyword real-life event relationship matches one or more of the keyword real-life event relationships in the database). Upon identifying a keyword real-life event relationship from the database that matches the inputted keyword real-life event relationship, the media guidance application may locate a relationship strength rating. The relationship strength rating may then be used to modify the affect (or weight given) to a user profile modification (or one or more criteria modifications in the user profile modification).

In some embodiments, the media guidance application may determine whether the current real-life event is a reoccurring real-life event. For example, reoccurring real-life events may be easier to detect (e.g., have a high relationship strength rating) and may be more likely to be attributed to a user (as opposed to a erroneous detection caused by a different user accessing the user's user profile, an erroneous user interaction that does not represent a preference of a user, etc.). In response to determining that the current real-life event is a reoccurring real-life event, the media guidance application may adjust a weight of the user profile modification based on a frequency of the reoccurring real-life event. For example, if a user profile modification (or one or more criteria modifications in the user profile modification) increases the weight of a particular criterion in a user profile by a factor of one for a non-occurring real-life event (or a real-life event not yet determined to be a reoccurring real-life event), the media guidance application may increase the weight of the particular criterion in the user profile by a factor of two if the user profile modification stems from a reoccurring real-life event. Moreover, the media guidance application may factor in the number of times the event has reoccurred when increasing or decreasing a weight. For example, the media guidance application may increase the weight attributed to a user profile modification as the frequency of the reoccurring real-life event increases.

In some aspects, the media guidance application may determine end dates for user profile modifications based on real-life events. For example, as opposed to modifying a user profile for a predetermined amount of time, the media guidance application may dynamically determine when to remove a user profile modification (or modify a user profile back to a previous state) based on subsequent user actions. For example, the media guidance application may modify a user profile such that the user profile no longer recommends content related to a real-life event (e.g., a traumatic climbing accident) until the media guidance application detects a subsequent real-life event that indicates that the user has recovered from the previous real-life event (e.g., the user has begun climbing again).

The media guidance application may retrieve first social media data indicative of a current real-life event of a user. For example, to determine current real-life events of users that may trigger a user profile modification, the media guidance application may retrieve various sources of current information about the user such as data retrieved from a social media site.

The media guidance application may parse the first social media data to identify a first keyword corresponding to the current real-life event. For example, if the media guidance application identifies the word "Benjamin" (the first name of the user's husband) next to, or in close proximity to, "divorce," the media guidance application may identify a keyword as "matrimonial divorce." Using the one or more of the aforementioned techniques, the media guidance application may identify keywords in the social media data.

The media guidance application may input the first keyword into a database listing user profile modifications associated with keywords corresponding to current real-life events. For example, the media guidance application may access a locally or remotely stored database of keywords that relate to different current real-life events, which may be populated with predetermined keyword relationships from a plurality of sources. For example, the words "scared" near "terrorist," may relate to a user profile modification to change a criterion for favorite genre from "action," which may remind a user of a recent terrorist attacks that scared the user, to "comedy," which will not remind the user of the recent terrorist attacks.

The media guidance application may identify a user profile modification corresponding to the first keyword from the database listing user profile modifications associated with keywords corresponding to current real-life events based on a comparison of the keyword to the keywords corresponding to current real-life events. For example, the media guidance application may input the identified keyword into the look-up table database and filter or sort the keywords in the database based on a relevancy of the keywords in the database (e.g., the degree to which the inputted keywords matches one or more of the keywords in the database). Upon identifying a keyword from the database that matches the inputted keyword, the media guidance application may locate a user profile modification (e.g., one or more criteria modifications) corresponding to the identified keyword (e.g., user profile modifications located in a field of the database associated with the identified keyword).

The media guidance application may apply the user profile modification to a user profile of the user. For example, if the media guidance application determines that the user profile modification corresponds to recommending only on-demand content, the media guidance application may not recommend broadcast content.

The media guidance application may input the user profile modification into a database listing keywords corresponding to ending the user profile modification. The media guidance application may input the user profile modification into the look-up table database and filter or sort the keywords in the database based on a relevancy of the user profile modifications in the database (e.g., the degree to which the inputted user profile modification matches one or more of the user profile modifications in the database). Upon identifying a user profile modification from the database that matches the inputted user profile modification, the media guidance application may locate keywords corresponding to ending the user profile modification (e.g., keywords, which if present in social media data, indicate that the user profile modification should be removed). For example, if the user profile modification stemmed from a "drug addiction," keywords corresponding to ending the user profile modification may include "drug-free," "sober," etc.

The media guidance application may identify keywords corresponding to ending the user profile modification. For example, in response to inputting the user profile modification into a database listing keywords corresponding to ending the user profile modification, the media guidance application may receive an output from the database in the form of a list of keywords that indicate the user profile modification should be ended. The media guidance application may then store this list of keywords and search for the keywords in social media data.

The media guidance application may retrieve second social media data indicative of the current real-life event of a user. For example, while a first post on a social media site may indicate a user is sad about a relationship break-up, a second post on a social media site may indicate that the user has recovered from the break-up (e.g., the user has started dating again).

The media guidance application may parse the second social media data to identify a second keyword corresponding to the current real-life event. For example, the media guidance application may search social media data for the presence of the keywords corresponding to ending the user profile modification. For example, the media guidance application may employ the techniques discussed above to determine the context and meaning of social media posts in order to identify relevant keywords or groups of keywords. For example, if the first keyword corresponded to a "relationship" status changing from "yes" to "no," the second keyword may correspond to the "relationship" status changing from "no" to "yes."

The media guidance application may compare the second keyword to the keywords corresponding to ending the user profile modification. For example, the media guidance application may adopt an iterative approach in which each keyword identified in a social media post is compared to a list of keywords corresponding to ending the user profile modification.

The media guidance application may remove the user profile modification from the user profile in response to the second keyword matching one of the keywords corresponding to ending the user profile modification. For example, in response to detecting a keyword in social media data that corresponds to ending the user profile modification, the media guidance application may determine that the user has recovered from the event that led to the user profile modification; thus, the user profile modification should be removed.

In some embodiments, the media guidance application may apply user profile modifications by adjusting criteria (and/or the weight attributed to the criteria) in a user profile. For example, the media guidance application may apply a user profile modification that indicates that a user no longer prefers media assets of the "horror" genre by modifying the "favorite genre" in a user profile. Alternatively or additionally, the media guidance application may apply user profile modifications, which may constitute individual changes to particular criteria, by adjusting the criteria, or the weight attributed to criteria, in the user profile. For example, the user profile may include a first criterion and a second criterion for selecting media assets for presentation to the user, wherein the first criterion corresponds to a first weight and the second criterion corresponds to a second weight. When applying the user profile modification to the user profile of the user for the time period, the media guidance application may determine the user profile modification corresponds to increasing the first weight corresponding to the first criterion in the user profile and increase the first weight corresponding to the first criterion in the user profile.

In some embodiments, the media guidance application may identify a relationship strength of the user profile modification and the keyword based on a relationship strength rating retrieved from the database listing user profile modifications associated with keywords corresponding to current real-life events and adjust a weight of the user profile modification based on the relationship strength of the user profile modification. For example, the media guidance application may apply user profile modifications based on how likely a particular keyword is to be indicative of the current real-life event actually occurring. The media guidance application may quantify this likelihood through a relationship strength rating. The relationship strength rating may be retrieved from a database, stored locally or remotely, and populated from third-party or user-specific data, listing relationship strength ratings corresponding to various keyword real-life event relationships. For example, the database may also be structured as a look-up table database. The media guidance application may input the keyword real-life event relationship into the look-up table database and filter or sort the keyword real-life event relationships in the database based on a relevancy of the real-life event relationship in the database (e.g., the degree to which the inputted keyword real-life event relationship matches one or more of the keyword real-life event relationships in the database). Upon identifying a keyword real-life event relationship from the database that matches the inputted keyword real-life event relationship, the media guidance application may locate a relationship strength rating. The relationship strength rating may then be used to modify the affect (or weight given) to a user profile modification (or one or more criteria modifications in the user profile modification).

In some embodiments, the media guidance application may determine whether the current real-life event is a reoccurring real-life event. For example, reoccurring real-life events may be easier to detect (e.g., have a high relationship strength rating) and may be more likely to be attributed to a user (as opposed to an erroneous detection caused by a different user accessing the user's user profile, an erroneous user interaction that does not represent a preference of a user, etc.). In response to determining that the current real-life event is a reoccurring real-life event, the media guidance application may adjust a weight of the user profile modification based on a frequency of the reoccurring real-life event. For example, if a user profile modification (or one or more criteria modifications in the user profile modification) increases the weight of a particular criterion in a user profile by a factor of one for a non-occurring real-life event (or a real-life event not yet determined to be a reoccurring real-life event), the media guidance application may increase the weight of the particular criterion in the user profile by a factor of two if the user profile modification stems from a reoccurring real-life event. Moreover, the media guidance application may factor in the number of times the event has reoccurred when increasing or decreasing a weight. For example, the media guidance application may increase the weight attributed to a user profile modification as the frequency of the reoccurring real-life event increases.

In some aspects, the media guidance application may determine user recovery times to real-life events. For example, the media guidance application may track the length of time that a particular user takes to recover from various real-life events. Specifically, the media guidance application may monitor for user actions that are consistent with the event type of the real-life event (or inconsistent with a user profile modification). For example, if an event type relates to a familial death, a media asset that features a familial death may have the same event type. Likewise, if a user profile modification results in the media guidance application no longer recommending content of a particular genre, the media guidance application may detect an inconsistent user action when the user requests content of that particular genre. Upon detecting the user action, the media guidance application may determine that the length of the recovery time. For example, if a user selects a media asset featuring a familial death, the media guidance application may determine the user has recovered from the real-life event. After determining that length of time, the media guidance application may update a user profile to reflect this information. For example, if the media guidance application determines that a user typically takes ten weeks to recover from a familial death, the media guidance application may determine that a time period for applying a user profile modification stemming from a familial death is ten weeks.

The media guidance application may retrieve first social media data indicative of a current real-life event of a user. For example, to determine current real-life events of users that may trigger a user profile modification, the media guidance application may retrieve various sources of current information about the user such as data retrieved from a social media site.

The media guidance application may parse the first social media data to identify a first keyword corresponding to the current real-life event. For example, if the media guidance application identifies the word "Benjamin" (the first name of the user's husband) next to, or in close proximity to, "divorce," the media guidance application may identify a keyword as "matrimonial divorce." Using the one or more of the aforementioned techniques, the media guidance application may identify keywords in the social media data.

The media guidance application may input the first keyword into a database listing event types associated with keywords corresponding to current real-life events. For example, the media guidance application may access a locally or remotely stored database of keywords that relate to different current real-life events, which may be populated with predetermined event types for different keywords from a plurality of sources. For example, the words "break-up" may relate to an event type that corresponds to an end of a relationship. In another example, the word "birth" may relate to an event type associated with a reduction in free time of the user.

The media guidance application may identify an event type corresponding to the keyword from the database listing event types associated with keywords corresponding to current real-life events based on a comparison of the keyword to the keywords corresponding to current real-life events. For example, the media guidance application may input the identified keyword into the look-up table database and filter or sort the keywords in the database based on a relevancy of the keywords in the database (e.g., the degree to which the inputted keywords matches one or more of the keywords in the database). Upon identifying a keyword from the database that matches the inputted keyword, the media guidance application may locate an event type corresponding to the identified keyword. Additionally, the media guidance application may retrieve a list of media assets that have the same event type. For example, the database may include a field for each event type that includes the media assets with the same event type.

The media guidance application may receive a user request for a media asset. For example, while the media guidance application does not recommend media assets that are of the determined event type (or are inconsistent with the user profile modification), the user may still be able to access these media assets.

The media guidance application may input the media asset into a database listing event types corresponding to the media asset. For example, the database may be structured as a look-up table database. The media guidance application may input the media asset into the look-up table database and retrieve the event types that correspond to the media asset.

The media guidance application may identify the media asset corresponds to the event type based on a comparison of the event type to the event types corresponding to the media asset. For example, after retrieving all of the event types that the media asset corresponds to, the media guidance application may compare each retrieved event type to the event type corresponding to the keyword corresponding to the current real-life event. The media guidance application may perform the comparison as an iterative process in order to determine if the media asset shares an event type associated with the current real-life event. If the media guidance application identifies that the media asset corresponds to the event type associated with the current real-life event, the media guidance application may determine that the user has recovered from the real-life event.

The media guidance application may calculate a time period between the current real-life event and the receipt of the user request. For example, upon determining that the user has recovered from the real-life event, the media guidance application may calculate a length of time of the recovery (e.g., the time period). For example, the media guidance application may record a time stamp of the current real-life event as well as a time-stamp of the receipt of the user request and determine a difference between the two time stamps. Alternatively or additionally, the media guidance application may store an event-specific counter that tracks (e.g., in days, hours, or other suitable units) the length of time from the real-life event to the receipt of the user request.

The media guidance application may update a user profile of the user to indicate the time period that corresponds to a recovery period for the type of event. For example, the media guidance application may store this time period as an average time period for the recovery from a particular real-life event. Accordingly, when subsequent real-life events of the same event type are detected, the media guidance application may determine a time period for applying a user profile modification.

For example, the media guidance application may retrieve second social media data indicative of a subsequent real-life event of the user. The media guidance application may then determine the subsequent real-life event is of the event type. In response to determining the subsequent real-life event is of the event type, the media guidance application may apply a user profile modification to the user profile based on the subsequent real-life event for the recovery period for the type of event.

In some embodiments, the media guidance application may identify a relationship strength of the event type and the keyword based on a relationship strength rating retrieved from the database listing event types associated with keywords corresponding to current real-life events and adjust a weight of the user profile modification based on the relationship strength of the user profile modification. For example, the media guidance application may apply user profile modifications based on how likely a particular keyword is to be indicative of the event type. The media guidance application may quantify this likelihood through a relationship strength rating. The relationship strength rating may be retrieved from a database, stored locally or remotely, and populated from third-party or user-specific data, listing relationship strength ratings corresponding to various keyword and event type relationships. For example, the database may also be structured as a look-up table database. The media guidance application may input the keyword and event type relationship into the look-up table database and filter or sort the keyword and event type relationships in the database based on a relevancy of the real-life event relationship in the database (e.g., the degree to which the inputted keyword and event type relationship matches one or more of the keyword and event type relationships in the database). Upon identifying a keyword and event type relationship from the database that matches the inputted keyword and event type relationship, the media guidance application may locate a relationship strength rating. The relationship strength rating may then be used to modify the affect (or weight given) to a user profile modification (or one or more criteria modifications in the user profile modification) stemming from the detection of that event type.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows illustrative examples of a display screen generated by a media guidance application for presenting content recommendations based on a user profile in accordance with some embodiments of the disclosure;

FIG. 9 shows an illustrative example of pseudocode for updating criteria in a user profile based on a user profile modification in accordance with some embodiments of the disclosure;

FIG. 11 shows an illustrative example of pseudocode for updating a user profile with user profile modification(s) corresponding to words in parsed data in accordance with some embodiments of the disclosure.

DETAILED DESCRIPTION OF THE DRAWINGS

Figure 1:
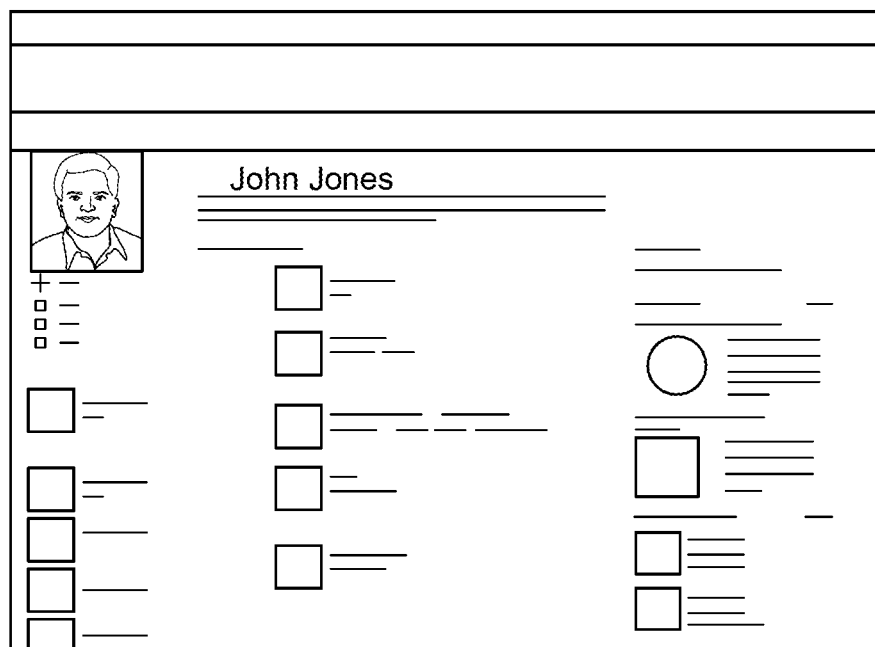
FIG. 1 shows an illustrative example of a display screen generated by a media guidance application that is presenting social media data in accordance with some embodiments of the disclosure.

Methods and systems are disclosed herein for a media guidance application that predicts user preferences based on detected events. As used herein, a "media guidance application," sometimes "an interactive media guidance application," or "a guidance application" refers to an interface that allows users to efficiently navigate content selections and easily identify content that they may desire.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application stores user viewing preferences for a user. The media guidance application may be personalized based on the user viewing preferences. A personalized media guidance application allows a user to receive custom displays, features, and content recommendations, to create a personalized "experience" with the media guidance application. This personalized experience may be created by allowing a user to input these customizations and/or by the media guidance application monitoring user activity to determine various user preferences. Users may access their personalized media guidance application by logging in or otherwise identifying themselves to the media guidance application. Customization of the media guidance application may be made in accordance with a user profile.

As referred to herein, "a user profile" refers to a collection of criteria that represents the user preferences (e.g., likes, dislikes, etc.) or other information (e.g., demographic, geographic, etc.) about a user. In some embodiments, the user preferences of the user may include user viewing preferences, which are user preferences related to the consumption of media assets. In some embodiments, individual preferences may be defined by individual user preference criteria. It should be noted that user preference criteria may include any criterion related to any preference of a user, including, but not limited to, user viewing preferences.

For example, the preferences indicated by user preference criteria may define characteristics for varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.), preferred content, including, but not limited to, preferred genre, actors, or any other attribute associated with content, and other desired customizations related to the consumption of media that are preferred by a user.

The media guidance application may allow a user to provide user preference criteria or may automatically compile user preference criteria. The media guidance application may, for example, monitor the content the user accesses and/or other interactions the user may have with the media guidance application. Additionally, the media guidance application may obtain all or part of other user profiles, including user preference criteria that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified media guidance application experience across the user's different user equipment devices. This type of user experience is described in greater detail below in connection with FIG. 4.

As referred to herein, "an event" refers to an occurrence that affects a user profile. To detect events, the media guidance application may parse data generated by the user. For example, data including, but not limited to, messages, calendar entries, postings, status updates, and/or any other content authored by the user may indicate changes to a user profile. In some embodiments, events may include content generated by a user for presentation on a social network or for sharing via social media.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

As referred to herein, "social media data" may be any data that is related to a social network. For example, social media data may be data (e.g., words) found in a post on a social media site. The media guidance application may parse this data to identify keywords for use in determining user profile modifications. An example of a social network site, which may present social media data, is shown in FIG. 1. Display 100 may include numerous types of information posted by a user or a different user that relates to current real-life events.

For example, a status update indicating that a user was recently engaged may be used by the media guidance application to update the user preferences (e.g., to include content targeted at recently engaged persons and/or content determined to be typically consumed by recently engaged persons). In another example, a calendar entry indicating that a user received a date request at an Italian restaurant not of the user's choosing from another user may be used by the media guidance application to maintain the user preferences of the user (e.g., not update the user preferences), which indicates a user does not enjoy Italian food (e.g., the user eating at an Italian restaurant).

In some embodiments, an event may relate to a real life event. As used herein, "a real-life event" refers to an occurrence in the life of a user. In some embodiments, a real-life event may be determined by the media guidance application based on data associated with an event as described herein. It should be noted that embodiments related to events may also relate to real-life events. For example, if the media guidance application determines a user preference criterion based on an identified event (e.g., a post to a social network describing what happened to a user that day), the media guidance application may also determine the content or context of the identified event (e.g., identify what happened to the user that day). The media guidance application may then determine a user preference criterion based on the real-life event and update the user preferences as described herein.

In some embodiments, an event may relate to a physiological or psychological condition of a user. For example, a microblog entry generated by a user may indicate that the user is depressed, feeling sick, etc. In some embodiments, these conditions may be determined by the media guidance application based on data associated with an event as described herein. Furthermore, it should be noted, embodiments related to events may also relate to physiological or psychological conditions of a user. For example, if media guidance application determines a user preference criterion based on an identified event (e.g., a post to a social network describing a physiological or psychological condition of a user), the media guidance application may also determine the content or context of the identified event (e.g., identify the physiological or psychological conditions of a user). The media guidance application may then determine a user preference criterion based on the physiological or psychological conditions of the user and update the user preferences as described herein.

In some embodiments, an event may relate to a new interest of a user. For example, a digitally shared graphic may indicate that the user has recently discovered a love for post-modern art. For example, a pinboard-style photo-sharing web-site may allow users to create and manage theme-based image collections such as interests or hobbies. The media guidance application may monitor the events related to the web-site to identify new interests or hobbies of the user. It should be noted, embodiments related to events may also relate to interests or hobbies. For example, if a media guidance application determines a user preference criterion based on an identified event (e.g., a post or a submission to the web-site indicating a new interest), the media guidance application may also determine the content or context of the identified submission. The media guidance application may then determine a user preference criterion based on the content or context of the submission as described herein.

In some embodiments, an event may relate to practical limitations of a user. For example, an event may be categorized by a limitation that it places on a user. For example, the birth of a child, the start of a new job, etc., may correspond to events that reduce the free time of a user or cause a reduction in schedule flexibility of the user. For example, if a current real-life event causes a user to have less free time (e.g., the birth of a child), the user profile modification may cause a media asset with a shorter play length to be recommended over a media asset with a longer play length. In another example, if a current real-life event causes a user to have less flexible schedule (e.g., the start of a new job), the user profile modification may cause an on-demand media asset to be recommended over a media asset available at a predetermined time and/or a media asset available at a predetermined time to be automatically recorded.

In some embodiments, a user preference criterion based on an event may include an expiration date (e.g., a date when the added user preference criterion should be removed from the user preferences). For example, in response to detecting a particular event (e.g., pregnancy of the user) the media guidance application may update the user preferences with a corresponding user preference criterion (e.g., indicating that the user is pregnant). Accordingly, the user may begin to receive media recommendations related to pregnancy. However, the media guidance application may also determine (e.g., based on a cross-reference with a database associated with events) that this event is associated with an expiration date (e.g., a date when the user preference criterion should no longer be applied to the user preferences). In this case, the expiration date may correspond to nine months from the date of the event (e.g., corresponding to the length of the pregnancy). When the expiration date is reached, the media guidance application may no longer apply the user preference criterion to the user preferences.

In another example, the media guidance application may determine that an event relates to a user being sick. The media guidance application may further determine the reason the user is sick (e.g., a cold). The media guidance application may further determine that this type of sickness is usually over in a few days. Therefore, the media guidance application may establish an expiration date for this user preference criterion as a few days later.

Additionally or alternatively, the media guidance application may apply one or more conditions to the user preference criterion. For example, a condition may indicate that the user preference criterion should be applied to the user preferences until a subsequent event is detected (e.g., an event indicating that the user gave birth). The media guidance application may then monitor (e.g., either continually or periodically) for the subsequent event. In response to detecting the subsequent event, the media guidance application may remove the initial user preference criterion (e.g., associate with pregnancy) and/or automatically apply another user preference criterion (e.g., associated with caring for infants).

As used herein, a user preference is "consistent" with a user profile, or the user preferences contained in a user profile, if the user profile predicts that a user would enjoy, or enjoy to a particular degree, the media asset associated with the activity. Likewise, an activity is "inconsistent" with a user profile, or the user preferences contained in a user profile, if the user profile predicts that a user would not enjoy, or not enjoy to a particular degree, the media asset associated with the activity.

For example, if a user's preference criteria indicate that a user enjoys "horror" movies, but does not enjoy "action" movies, and the user views a "horror" movie, the activity is consistent. In contrast, if the user preference criteria indicate that a user enjoys "horror" movies, but does not enjoy "action" movies, and the user views an "action" movie, the activity is inconsistent. Likewise, if the user's preference criteria indicate that there is an eighty percent chance that a user selects a "horror" movie, and a ten percent chance that the user selects an "action" movie, and the user selects the "horror" movie, the activity is consistent. Whereas, if the user's preference criteria indicate that there is an eighty percent chance that a user selects a "horror" movie, and a ten percent chance that the user selects an "action" movie, and the user selects the "action" movie, the activity is inconsistent.

In another example, if user preference criteria indicate that the favorite actors of the user are Actors A, B, and C, and the user selects a television program with only Actor A, the activity of the user is consistent. In contrast, if user preference criteria indicate that the favorite actors of the user are Actors A, B, and C, but the user selects a television program with only Actor D, the activity of the user is inconsistent.

With the advent of the Internet, mobile computing, and high-speed wireless networks, users are accessing media on user equipment devices on which they traditionally did not.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 2 show illustrative display screens that may be used to provide media guidance data. The display screens shown in FIG. 2 may be implemented on any suitable user equipment device or platform. While the displays of FIG. 2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. In some embodiments, media content recommendations based on the user profile may appear in the interfaces shown in FIG. 2. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

Another display arrangement for providing media guidance is shown in display 250. Video mosaic display 250 includes selectable options 252 for content information organized based on content type, genre, and/or other organization criteria. In display 250, television listings option 254 is selected, thus providing listings 256, 258, 260, and 262 as broadcast program listings. In display 250 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 258 may include more than one portion, including media portion 264 and text portion 266. Media portion 264 and/or text portion 266 may be selectable to view content in full-screen or to view information related to the content displayed in media portion 264 (e.g., to view listings for the channel that the video is displayed on).

The listings in display 250 are of different sizes (i.e., listing BBBB06 is larger than listings 258, 260, and 262), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed, for example, Yates, U.S. Patent Application Publication No. 2010/0153885, filed Nov. 12, 2009, which is hereby incorporated by reference herein in its entirety.

Figure 3:
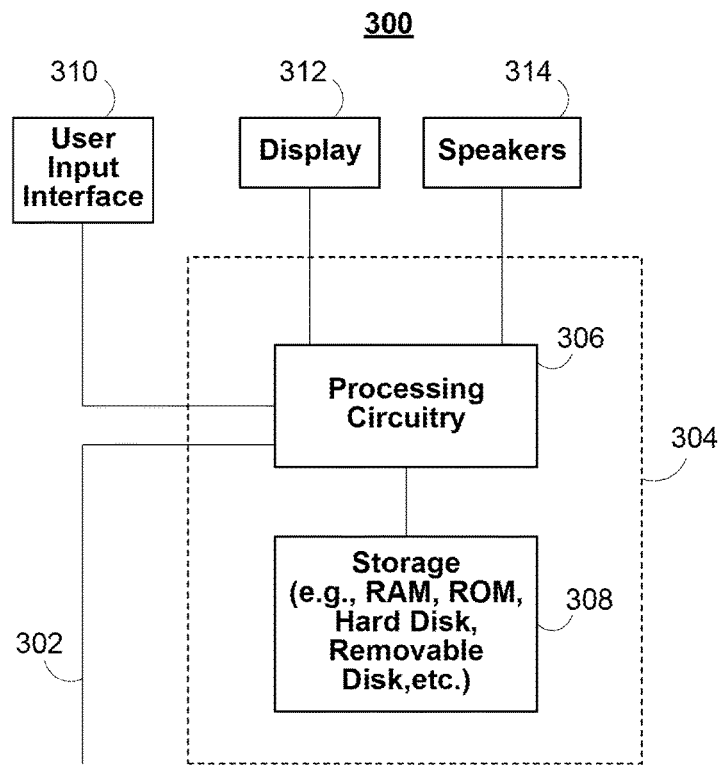
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
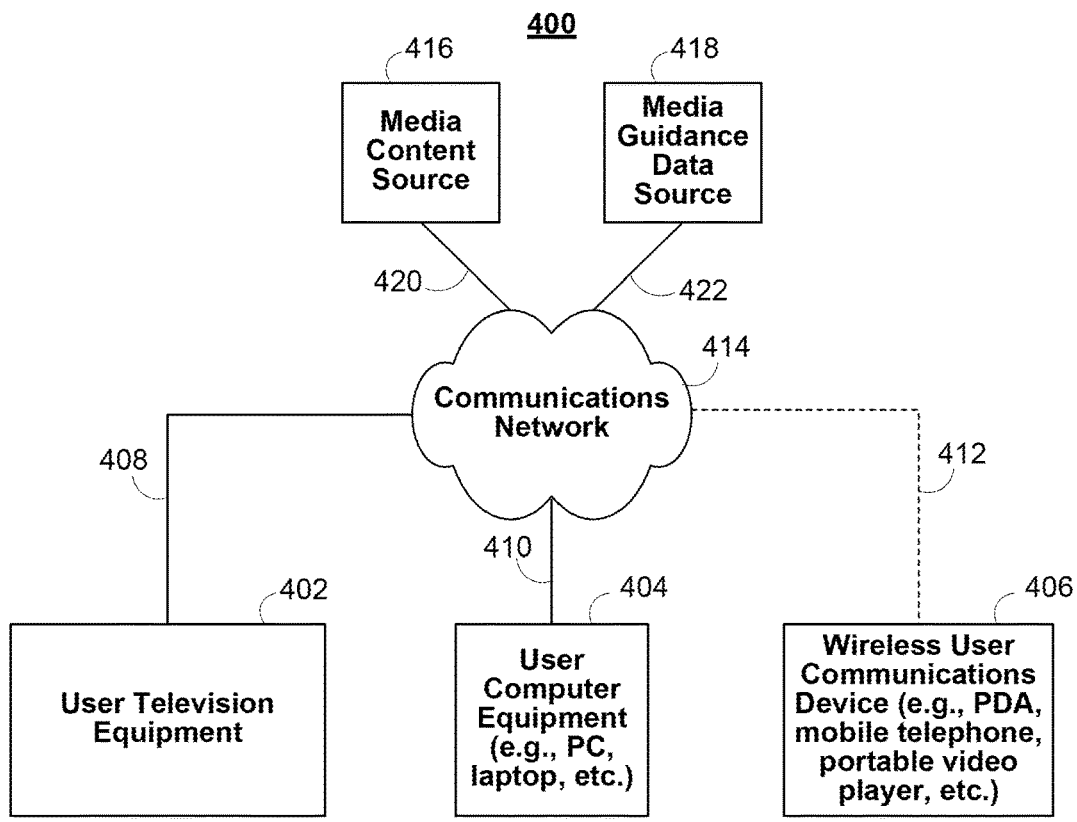
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
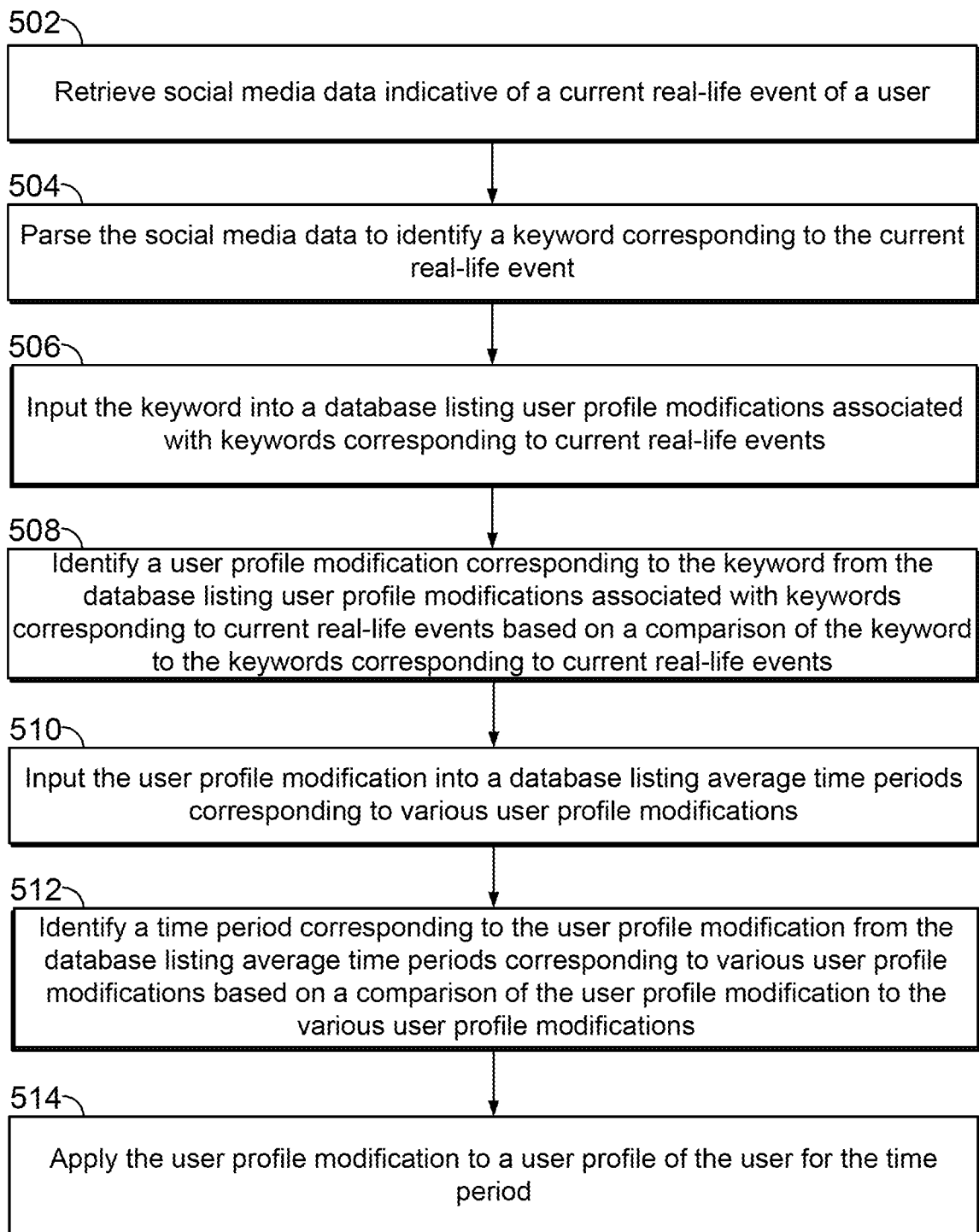
FIG. 5 is a flowchart of illustrative steps for determining how long to modify user profiles based on real-life events in accordance with some embodiments of the disclosure.

FIG. 5 is a flowchart of illustrative steps for determining how long to modify user profiles based on real-life events. It should be noted that process 500 or any step thereof could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to determine how long to modify user profiles based on real-life events. In addition, one or more steps of process 500 may be incorporated into or combined with one or more steps of any other process or embodiment (e.g., as described in relation to FIGS. 6-11).

At step 502, the media guidance application retrieves (e.g., via control circuitry 304 (FIG. 3)) social media data (e.g., as presented on display 100 (FIG. 1)) indicative of a current real-life event of a user. For example, to determine current real-life events of users that may trigger a user profile modification, the media guidance application may retrieve (e.g., via control circuitry 304 (FIG. 3)) various sources of current information about the user such as data retrieved from a social media site (e.g., from local storage 308 FIG. 3) and/or any location accessible via communications network 414 (FIG. 4)). Such information may include status updates provided by the user or third parties that have a relationship to the user (e.g., a social network "friend" and/or social network contact of the user).

At step 504, the media guidance application parses (e.g., via control circuitry 304 (FIG. 3)) the social media data to identify a keyword corresponding to the current real-life event. For example, the media application may use multiple types of optical character recognition and/or fuzzy logic, for example, when processing keyword(s) retrieved from social media data (e.g., textual data, translated audio data, user inputs, etc.). For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical.

Moreover, the media guidance application may detect (e.g., via control circuitry 304 (FIG. 3)) the relationship (e.g., the frequency of use, proximity of user, etc.) of one word to another in other to determine a context of the words. For example, if the media guidance application identifies the word "crash" next to, or in close proximity to, "car," the media guidance application may identify a keyword as "car crash." Using the one or more of the aforementioned techniques, the media guidance application may identify keywords in the social media data.

At step 506, the media guidance application inputs (e.g., via control circuitry 304 (FIG. 3)) the keyword into a database (e.g., located at storage 308 (FIG. 3) and/or any location accessible via communications network 414 (FIG. 4)) listing user profile modifications associated with keywords corresponding to current real-life events. For example, the media guidance application may access (e.g., via control circuitry 304 (FIG. 3)) a locally or remotely stored database of keywords that relate to different current real-life events, which may be populated with predetermined keyword relationships from a plurality of sources. For example, the word "break-up," may relate to a user profile modification to change a criterion for favorite genre from "romantic comedy," which may remind a user of a recent break-up with a boyfriend, to "action," which will not remind the user of the break-up. In another example, the word "break-up," may relate to a user profile modifications to increase/decrease a weight attributed to a particular criterion (e.g., genre) as the favorite genre of the user is "romantic comedy," which may remind the user of the recent break-up. Accordingly, other criteria in the user profile (e.g., favorite actor, preferred play length, etc.) may have more weight attributed to them as content corresponding to the other criteria is less likely to remind the user of the recent break-up.

At step 506, the media guidance application identifies (e.g., via control circuitry 304 (FIG. 3)) a user profile modification corresponding to the keyword from the database listing user profile modifications associated with keywords corresponding to current real-life events based on a comparison of the keyword to the keywords corresponding to current real-life events. For example, the database may be structured as a look-up table database. The media guidance application may input (e.g., via control circuitry 304 (FIG. 3)) the identified keyword into the look-up table database and filter or sort the keywords in the database based on a relevancy of the keywords in the database (e.g., the degree to which the inputted keywords matches one or more of the keywords in the database). Upon identifying a keyword from the database that matches the inputted keyword, the media guidance application may locate a user profile modification (e.g., one or more criteria modifications) corresponding to the identified keyword (e.g., user profile modifications located in a field of the database associated with the identified keyword).

At step 510, the media guidance application inputs (e.g., via control circuitry 304 (FIG. 3)) the user profile modification into a database (e.g., located at storage 308 (FIG. 3) and/or any location accessible via communications network 414 (FIG. 4)) listing average time periods corresponding to various user profile modifications. For example, the media guidance application may access a locally or remotely stored database of keywords that relate to different time periods for which particular user profile modifications should be applied to a given user profile. The time periods may be determined based on data received from third parties (e.g., factory defaults, user surveys, industry standards, etc.) and/or past user history with regard to real-life events. For example, the database may indicate that "break-ups" correspond to a month-long user profile modification time period, whereas "family death" corresponds to a year-long user profile modification time period.

At step 512, the media guidance application identifies (e.g., via control circuitry 304 (FIG. 3)) a time period corresponding to the user profile modification from the database listing average time periods corresponding to various user profile modifications based on a comparison of the user profile modification to the various user profile modifications. For example, the database may also be structured as a look-up table database. The media guidance application may input the user profile modification into the look-up table database and filter or sort the keywords in the database based on a relevancy of the user profile modification in the database (e.g., the degree to which the inputted user profile modification matches one or more of the user profile modifications in the database). Upon identifying a user profile modification from the database that matches the inputted user profile modification, the media guidance application may locate an average time period corresponding to the identified user profile modification (e.g., a time period located in a field of the database associated with the identified keyword).

At step 514, the media guidance application applies (e.g., via control circuitry 304 (FIG. 3)) the user profile modification to a user profile of the user for the time period. For example, if the media guidance application determines that the user profile modification corresponds to presenting only media assets with short play lengths and that that user profile modification corresponds to a year-long time period, the media guidance application may only recommend media assets with a short play length for the next year.

In some embodiments, the media guidance application may apply (e.g., via control circuitry 304 (FIG. 3)) user profile modifications by adjusting criteria (and/or the weight attributed to the criteria) in a user profile. For example, the media guidance application may apply (e.g., via control circuitry 304 (FIG. 3)) a user profile modification that indicates that a user no longer prefers media assets of the "horror" genre by modifying the "favorite genre" in a user profile. Alternatively or additionally, the media guidance application may apply (e.g., via control circuitry 304 (FIG. 3)) user profile modifications, which may constitute individual changes to particular criteria, by adjusting the criteria, or the weight attributed to criteria, in the user profile. For example, the user profile may include a first criterion and a second criterion for selecting media assets for presentation to the user, wherein the first criterion corresponds to a first weight and the second criterion corresponds to a second weight. When applying the user profile modification to the user profile of the user for the time period, the media guidance application may determine the user profile modification corresponds to increasing the first weight corresponding to the first criterion in the user profile and increase the first weight corresponding to the first criterion in the user profile.

In some embodiments, the media guidance application may identify (e.g., via control circuitry 304 (FIG. 3)) a relationship strength of the user profile modification and the keyword based on a relationship strength rating retrieved from the database listing user profile modifications associated with keywords corresponding to current real-life events and adjust a weight of the user profile modification based on the relationship strength of the user profile modification. For example, the media guidance application may apply user profile modifications based on how likely a particular keyword is to be indicative of the current real-life event actually occurring. The media guidance application may quantify this likelihood through a relationship strength rating.

The relationship strength rating may be retrieved from a database, stored locally or remotely, and populated from third party or user specific data, listing relationship strength ratings corresponding to various keyword real-life event relationships. For example, the database may also be structured as a look-up table database. The media guidance application may input the keyword real-life event relationship into the look-up table database and filter or sort the keyword real-life event relationships in the database based on a relevancy of the real-life event relationship in the database (e.g., the degree to which the inputted keyword real-life event relationship matches one or more of the keyword real-life event relationships in the database). Upon identifying a keyword real-life event relationship from the database that matches the inputted keyword real-life event relationship, the media guidance application may locate a relationship strength rating. The relationship strength rating may then be used to modify the affect (or weight given) to a user profile modification (or one or more criteria modifications in the user profile modification).

In some embodiments, the media guidance application may determine (e.g., via control circuitry 304 (FIG. 3)) whether the current real-life event is a reoccurring real-life event. For example, reoccurring real-life events may be easier to detect (e.g., have a high relationship strength rating) and may be more likely to be attributed to a user (as opposed to an erroneous detection caused by a different user accessing the user's user profile, an erroneous user interaction that does not represent a preference of a user, etc.). In response to determining that the current real-life event is a reoccurring real-life event, the media guidance application may adjust a weight of the user profile modification based on a frequency of the reoccurring real-life event.

For example, if a user profile modification (or one or more criteria modifications in the user profile modification) increases the weight of a particular criterion in a user profile by a factor of one for a non-reoccurring real-life event (or a real-life event not yet determined to be a reoccurring real-life event), the media guidance application may increase the weight of the particular criterion in the user profile by a factor of two if the user profile modification stems from a reoccurring real-life event. Moreover, the media guidance application may factor in the number of times the event has reoccurred when increasing or decreasing a weight. For example, the media guidance application may increase the weight attributed to a user profile modification as the frequency of the reoccurring real-life event increases.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

Figure 6:
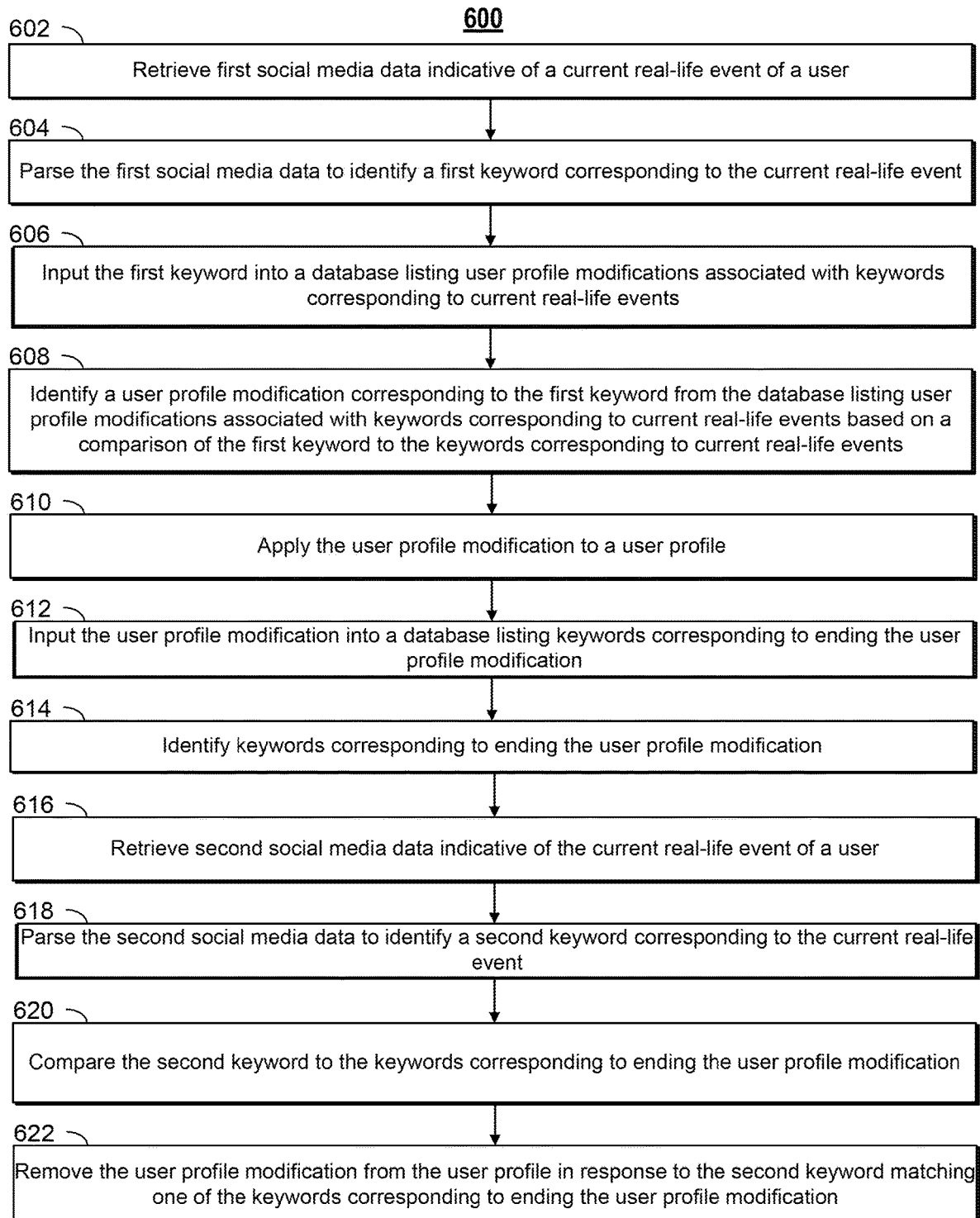
FIG. 6 is a flowchart of illustrative steps for determining end dates for user profile modifications based on real-life events in accordance with some embodiments of the disclosure.

FIG. 6 is a flowchart of illustrative steps for determining end dates for user profile modifications based on real-life events. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to determine end dates for user profile modifications based on real-life events. In addition, one or more steps of process 600 may be incorporated into or combined with one or more steps of any other process or embodiment (e.g., as described in relation to FIGS. 5 and 7-11).

At step 602, the media guidance application retrieves (e.g., via control circuitry 304 (FIG. 3)) first social media data (e.g., presented on display 100 (FIG. 1)) indicative of a current real-life event of a user. For example, to determine current real-life events of users that may trigger a user profile modification, the media guidance application may retrieve various sources of current information about the user such as data retrieved from a social media site. Such information may include status updates provided by the user or third parties that have a relationship to the user (e.g., a social network "friend" and/or social network contact of the user).

At step 604, the media guidance application parses (e.g., via control circuitry 304 (FIG. 3)) the first social media data to identify a first keyword corresponding to the current real-life event. For example, the media application may use multiple types of optical character recognition and/or fuzzy logic, for example, when processing keyword(s) retrieved from social media data (e.g., textual data, translated audio data, user inputs, etc.). For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical. Moreover, the media guidance application may detect the relationship (e.g., the frequency of use, proximity of user, etc.) of one word to another in order to determine a context of the words. For example, if the media guidance application identifies the word "Benjamin" (the first name of the user's husband) next to, or in close proximity to, "divorce," the media guidance application may identify a keyword as "matrimonial divorce." Using the one or more of the aforementioned techniques, the media guidance application may identify keywords in the social media data.

At step 606, the media guidance application inputs (e.g., via control circuitry 304 (FIG. 3)) the first keyword into a database (e.g., located at storage 308 (FIG. 3) and/or any location accessible via communications network 414 (FIG. 4)) listing user profile modifications associated with keywords corresponding to current real-life events. For example, the media guidance application may access a locally or remotely stored database of keywords that relate to different current real-life events, which may be populated with predetermined keyword relationships from a plurality of sources. For example, the word "scared" near "terrorist,"

may relate to a user profile modification to change a criterion for favorite genre from "action," which may remind a user of a recent terrorists attacks that scared the user, to "comedy," which will not remind the user of the recent terrorist attacks. In another example, the words "hate" and "scary," may relate to a user profile modification to increase/decrease a weight attributed to a particular criterion (e.g., genre) as the favorite genre of the user is "horror," which may correspond to content that the user does not like (e.g., the media guidance application may determine that the user "hates" to be "scared"). Accordingly, other criteria in the user profile (e.g., favorite actor, preferred play length, etc.) may have more weight attributed to them as content corresponding to the other criteria is less likely to scare the user.

At step 608, the media guidance application identifies (e.g., via control circuitry 304 (FIG. 3)) a user profile modification corresponding to the first keyword from the database listing user profile modifications associated with keywords corresponding to current real-life events based on a comparison of the keyword to the keywords corresponding to current real-life events. For example, the database may be structured as a look-up table database. The media guidance application may input the identified keyword into the look-up table database and filter or sort the keywords in the database based on a relevancy of the keywords in the database (e.g., the degree to which the inputted keyword matches one or more of the keywords in the database). Upon identifying a keyword from the database that matches the inputted keyword, the media guidance application may locate a user profile modification (e.g., one or more criteria modifications) corresponding to the identified keyword (e.g., user profile modifications located in a field of the database associated with the identified keyword).

At step 610, the media guidance application applies (e.g., via control circuitry 304 (FIG. 3)) the user profile modification to a user profile of the user. For example, if the media guidance application determines that the user profile modification corresponds to recommending only on-demand content, the media guidance application may not recommend broadcast content.

At step 612, the media guidance application inputs (e.g., via control circuitry 304 (FIG. 3)) the user profile modification into a database (e.g., located at storage 308 (FIG. 3) and/or any location accessible via communications network 414 (FIG. 4)) listing keywords corresponding to ending the user profile modification. For example, the database may also be structured as a look-up table database. The media guidance application may input the user profile modification into the look-up table database and filter or sort the keywords in the database based on a relevancy of the user profile modifications in the database (e.g., the degree to which the inputted user profile modification matches one or more of the user profile modifications in the database). Upon identifying a user profile modification from the database that matches the inputted user profile modification, the media guidance application may locate keywords corresponding to ending the user profile modification (e.g., keywords which, if present in social media data, indicate that the user profile modification should be removed). For example, if the user profile modification stemmed from a "drug addiction," keywords corresponding to ending the user profile modification may include "drug-free," "sober," etc.

At step 614, the media guidance application identifies (e.g., via control circuitry 304 (FIG. 3)) keywords corresponding to ending the user profile modification. For example, in response to inputting the user profile modification into a database listing keywords corresponding to ending the user profile modification, the media guidance application may receive an output from the database in the form of a list of keywords that indicate the user profile modification should be ended. The media guidance application may then store this list of keywords and search for the keywords in social media data.

At step 616, the media guidance application retrieves (e.g., via control circuitry 304 (FIG. 3)) second social media data (e.g., presented on display 100 (FIG. 1)) indicative of the current real-life event of a user. For example, to while a first post on a social media site may indicate a user is sad about a relationship break-up, a second post on a social media site may indicate that the user has recovered from the break-up (e.g., the user has started dating again). Such information may include status updates provided by the user or third parties that have a relationship to the user (e.g., a social network "friend" and/or social network contact of the user).

At step 618, the media guidance application parses (e.g., via control circuitry 304 (FIG. 3)) the second social media data to identify a second keyword corresponding to the current real-life event. For example, the media guidance application may search social media data for the presence of the keywords corresponding to ending the user profile modification. For example, the media guidance application may employ the techniques discussed above to determine the context and meaning of social media posts in order to identify relevant keywords or groups of keywords. For example, if the first keyword corresponded to a "relationship" status changing from "yes" to "no," the second keyword may correspond to the "relationship" status changing from "no" to "yes."

At step 620, the media guidance application compares (e.g., via control circuitry 304 (FIG. 3)) the second keyword to the keywords corresponding to ending the user profile modification. For example, the media guidance application may adopt an iterative approach in which each keyword identified in a social media post is compared to a list of keywords corresponding to ending the user profile modification.

At step 622, the media guidance application removes (e.g., via control circuitry 304 (FIG. 3)) the user profile modification from the user profile in response to the second keyword matching one of the keywords corresponding to ending the user profile modification. For example, in response to detecting a keyword in social media data that corresponds to ending the user profile modification, the media guidance application may determine that the user has recovered from the event that led to the user profile modification; thus, the user profile modification should be removed (or the user profile should be modified to correspond to a state prior to the user profile modification).

In some embodiments, the media guidance application may apply (e.g., via control circuitry 304 (FIG. 3)) user profile modifications by adjusting criteria (and/or the weight attributed to the criteria) in a user profile. For example, the media guidance application may apply a user profile modification that indicates that a user no longer prefers media assets of the "horror" genre by modifying the "favorite genre" in a user profile. Alternatively or additionally, the media guidance application may apply user profile modifications, which may constitute individual changes to particular criteria, by adjusting the criteria, or the weight attributed to criteria, in the user profile. For example, the user profile may include a first criterion and a second criterion for selecting media assets for presentation to the user, wherein the first criterion corresponds to a first weight and the second criterion corresponds to a second weight. When applying the user profile modification to the user profile of the user for the time period, the media guidance application may determine the user profile modification corresponds to increasing the first weight corresponding to the first criterion in the user profile and increase the first weight corresponding to the first criterion in the user profile.

In some embodiments, the media guidance application may identify (e.g., via control circuitry 304 (FIG. 3)) a relationship strength of the user profile modification and the keyword based on a relationship strength rating retrieved from the database listing user profile modifications associated with keywords corresponding to current real-life events and adjust a weight of the user profile modification based on the relationship strength of the user profile modification. For example, the media guidance application may apply user profile modifications based on how likely a particular keyword is to be indicative of the current real-life event actually occurring. The media guidance application may quantify this likelihood through a relationship strength rating. The relationship strength rating may be retrieved from a database, stored locally or remotely, and populated from third-party or user-specific data, listing relationship strength ratings corresponding to various keyword real-life event relationships. For example, the database may also be structured as a look-up table database. The media guidance application may input the keyword real-life event relationship into the look-up table database and filter or sort the keyword real-life event relationships in the database based on a relevancy of the real-life event relationship in the database (e.g., the degree to which the inputted keyword real-life event relationship matches one or more of the keyword real-life event relationships in the database). Upon identifying a keyword real-life event relationship from the database that matches the inputted keyword real-life event relationship, the media guidance application may locate a relationship strength rating. The relationship strength rating may then be used to modify the affect (or weight given) to a user profile modification (or one or more criteria modifications in the user profile modification).

In some embodiments, the media guidance application may determine (e.g., via control circuitry 304 (FIG. 3)) whether the current real-life event is a reoccurring real-life event. For example, reoccurring real-life events may be easier to detect (e.g., have a high relationship strength rating) and may be more likely to be attributed to a user (as opposed to a erroneous detection caused by a different user accessing the user's user profile, an erroneous user interaction that does not represent a preference of a user, etc.). In response to determining that the current real-life event is a reoccurring real-life event, the media guidance application may adjust a weight of the user profile modification based on a frequency of the reoccurring real-life event. For example, if a user profile modification (or one or more criteria modifications in the user profile modification) increases the weight of a particular criterion in a user profile by a factor of one for a non-reoccurring real-life event (or a real-life event not yet determined to be a reoccurring real-life event), the media guidance application may increase the weight of the particular criterion in the user profile by a factor of two if the user profile modification stems from a reoccurring real-life event. Moreover, the media guidance application may factor in the number of times the event has reoccurred when increasing or decreasing a weight. For example, the media guidance application may increase the weight attributed to a user profile modification as the frequency of the reoccurring real-life event increases.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

Figure 7:
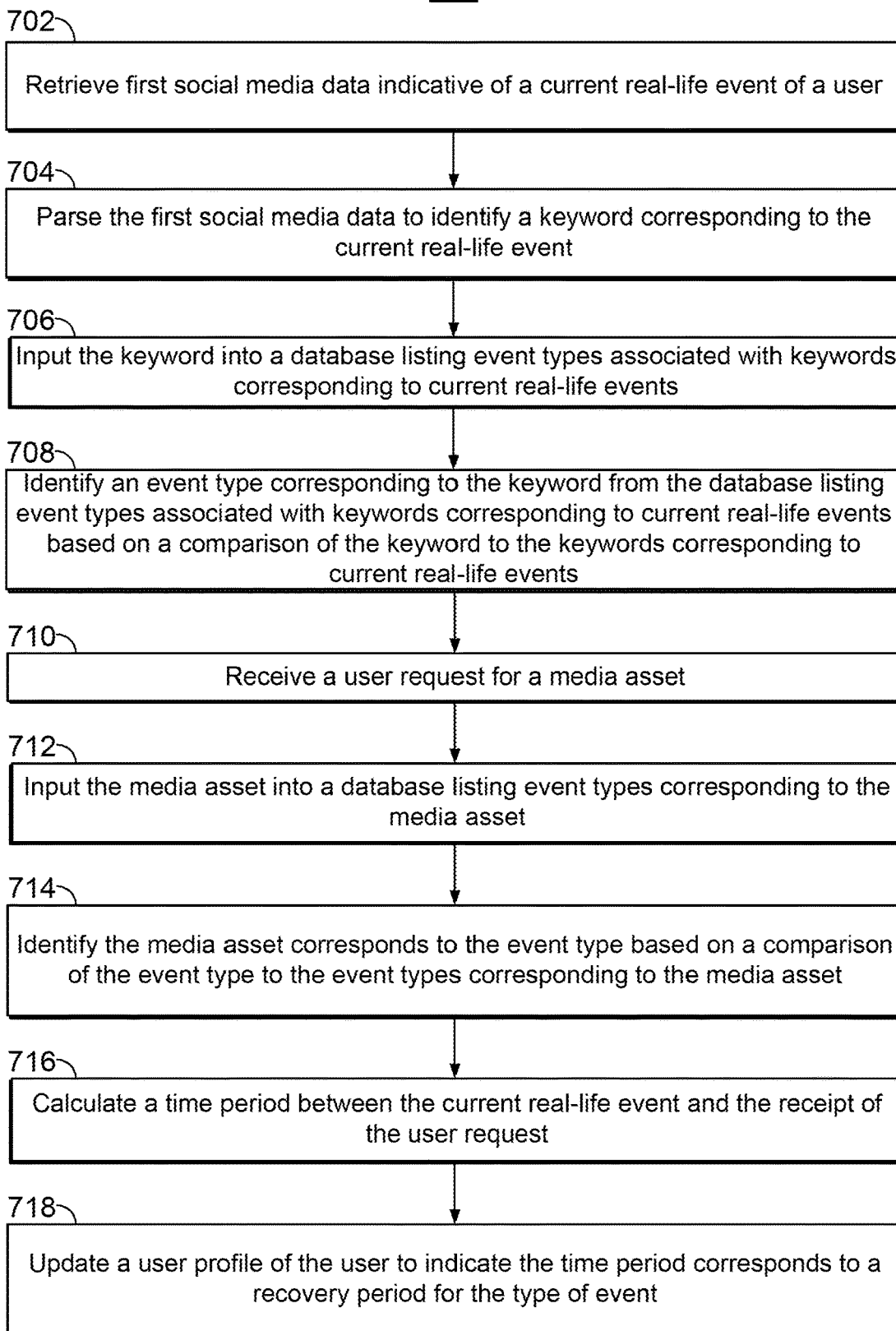
FIG. 7 is a flowchart of illustrative steps for determining user recovery times to real-life events in accordance with some embodiments of the disclosure.

FIG. 7 is a flowchart of illustrative steps for determining user recovery times to real-life events. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to determine user recovery times to real-life events. In addition, one or more steps of process 700 may be incorporated into or combined with one or more steps of any other process or embodiment (e.g., as described in relation to FIGS. 6-11).

At step 702, the media guidance application retrieves (e.g., via control circuitry 304 (FIG. 3)) first social media data (e.g., presented on display 100 (FIG. 1)) indicative of a current real-life event of a user. For example, to determine current real-life events of users that may trigger a user profile modification, the media guidance application may retrieve various sources of current information about the user such as data retrieved from a social media site. Such information may include status updates provided by the user or third parties that have a relationship to the user (e.g., a social network "friend" and/or social network contact of the user).

At step 704, the media guidance application parses (e.g., via control circuitry 304 (FIG. 3)) the first social media data to identify a first keyword corresponding to the current real-life event. For example, the media application may use multiple types of optical character recognition and/or fuzzy logic, for example, when processing keyword(s) retrieved from social media data (e.g., textual data, translated audio data, user inputs, etc.). For example, using fuzzy logic, the media application (e.g., via a content recognition module or algorithm incorporated into, or accessible by, the media application) may determine two fields and/or values to be identical even though the substance of the data or value (e.g., two different spellings of a potential destination) is not identical.

Moreover, the media guidance application may detect the relationship (e.g., the frequency of use, proximity of user, etc.) of one word to another in order to determine a context of the words. For example, if the media guidance application identifies the word "Benjamin" (the first name of the user's husband) next to, or in close proximity to, "divorce," the media guidance application may identify a keyword as "matrimonial divorce." Using the one or more of the aforementioned techniques, the media guidance application may identify keywords in the social media data.

At step 706, the media guidance application inputs (e.g., via control circuitry 304 (FIG. 3)) the first keyword into a database (e.g., located at storage 308 (FIG. 3) and/or any location accessible via communications network 414 (FIG. 4)) listing event types associated with keywords corresponding to current real-life events. For example, the media guidance application may access a locally or remotely stored database of keywords that relate to different current real-life events, which may be populated with predetermined event types for different keywords from a plurality of sources. For example, the word "break-up" may relate to an event type that corresponds to an end of a relationship. In another example, the word "birth" may relate to an event type associated with a reduction in free time of the user.

At step 708, the media guidance application identifies (e.g., via control circuitry 304 (FIG. 3)) an event type corresponding to the keyword from the database listing event types associated with keywords corresponding to current real-life events based on a comparison of the keyword to the keywords corresponding to current real-life events. For example, the database may be structured as a look-up table database. The media guidance application may input the identified keyword into the look-up table database and filter or sort the keywords in the database based on a relevancy of the keywords in the database (e.g., the degree to which the inputted keywords matches one or more of the keywords in the database). Upon identifying a keyword from the database that matches the inputted keyword, the media guidance application may locate an event type corresponding to the identified keyword. Additionally, the media guidance application may retrieve a list of media assets that have the same event type. For example, the database may include a field for each event type that includes the media assets with the same event type.

At step 710, the media guidance application receives (e.g., via control circuitry 304 (FIG. 3)) a user request for a media asset. For example, the user may access display 200 or 250 (FIG. 2) and request a media asset via user input interface 310 (FIG. 3). For example, while the media guidance application does not recommend media assets that are of the determined event type (or are inconsistent with the user profile modification), the user may still be able to access these media assets.

At step 712, the media guidance application inputs (e.g., via control circuitry 304 (FIG. 3)) the media asset into a database (e.g., located at storage 308 (FIG. 3) and/or any location accessible via communications network 414 (FIG. 4)) listing event types corresponding to the media asset. For example, the database may be structured as a look-up table database. The media guidance application may input the media asset into the look-up table database and retrieve the event types that correspond to the media asset.

At step 714, the media guidance application identifies (e.g., via control circuitry 304 (FIG. 3)) the media asset corresponds to the event type based on a comparison of the event type to the event types corresponding to the media asset. For example, after retrieving all of the event types that the media asset corresponds to, the media guidance application may compare each retrieved event type to the event type corresponding to the keyword corresponding to the current real-life event. The media guidance application may perform the comparison as an iterative process in order to determine if the media asset shares an event type associated with the current real-life event. If the media guidance application identifies that the media asset corresponds to the event type associated with the current real-life event, the media guidance application may determine that the user has recovered from the real-life event.

At step 716, the media guidance application calculates (e.g., via control circuitry 304 (FIG. 3)) a time period between the current real-life event and the receipt of the user request. For example, upon determining that the user has recovered from the real-life event, the media guidance application may calculate a length of time of the recovery (e.g., the time period). For example, the media guidance application may record a time stamp of the current real-life event as well as a time-stamp of the receipt of the user request and determine a difference between the two time stamps. Alternatively or additionally, the media guidance application may store an event-specific counter that tracks (e.g., in days, hours, or other suitable units) the length of time from the real-life event to the receipt of the user request.

At step 718, the media guidance application updates (e.g., via control circuitry 304 (FIG. 3)) a user profile of the user to indicate the time period corresponds to a recovery period for the type of event. For example, the media guidance application may store this time period as an average time period for the recovery from a particular real-life event.

Accordingly, when subsequent real-life events of the same event type are detected, the media guidance application may determine a time period for applying a user profile modification.

For example, the media guidance application may retrieve second social media data indicative of a subsequent real-life event of the user. The media guidance application may then determine the subsequent real-life event is of the event type. In response to determining the subsequent real-life event is of the event type, the media guidance application may apply a user profile modification to the user profile based on the subsequent real-life event for the recovery period for the type of event.

In some embodiments, the media guidance application may identify a relationship strength of the event type and the keyword based on a relationship strength rating retrieved from the database listing event types associated with keywords corresponding to current real-life events and adjust a weight of the user profile modification based on the relationship strength of the user profile modification. For example, the media guidance application may apply user profile modifications based on how likely a particular keyword is to be indicative of the event type. The media guidance application may quantify this likelihood through a relationship strength rating. The relationship strength rating may be retrieved from a database, stored locally or remotely, and populated from third party or user specific data, listing relationship strength ratings corresponding to various keyword and event type relationships. For example, the database may also be structured as a look-up table database. The media guidance application may input the keyword and event type relationship into the look-up table database and filter or sort the keyword and event type relationships in the database based on a relevancy of the real-life event relationship in the database (e.g., the degree to which the inputted keyword and event type relationship matches one or more of the keyword and event type relationships in the database). Upon identifying a keyword and event type relationship from the database that matches the inputted keyword and event type relationship, the media guidance application may locate a relationship strength rating. The relationship strength rating may then be used to modify the affect (or weight given) to a user profile modification (or one or more criteria modifications in the user profile modification) stemming from the detection of that event type.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

Figure 8:
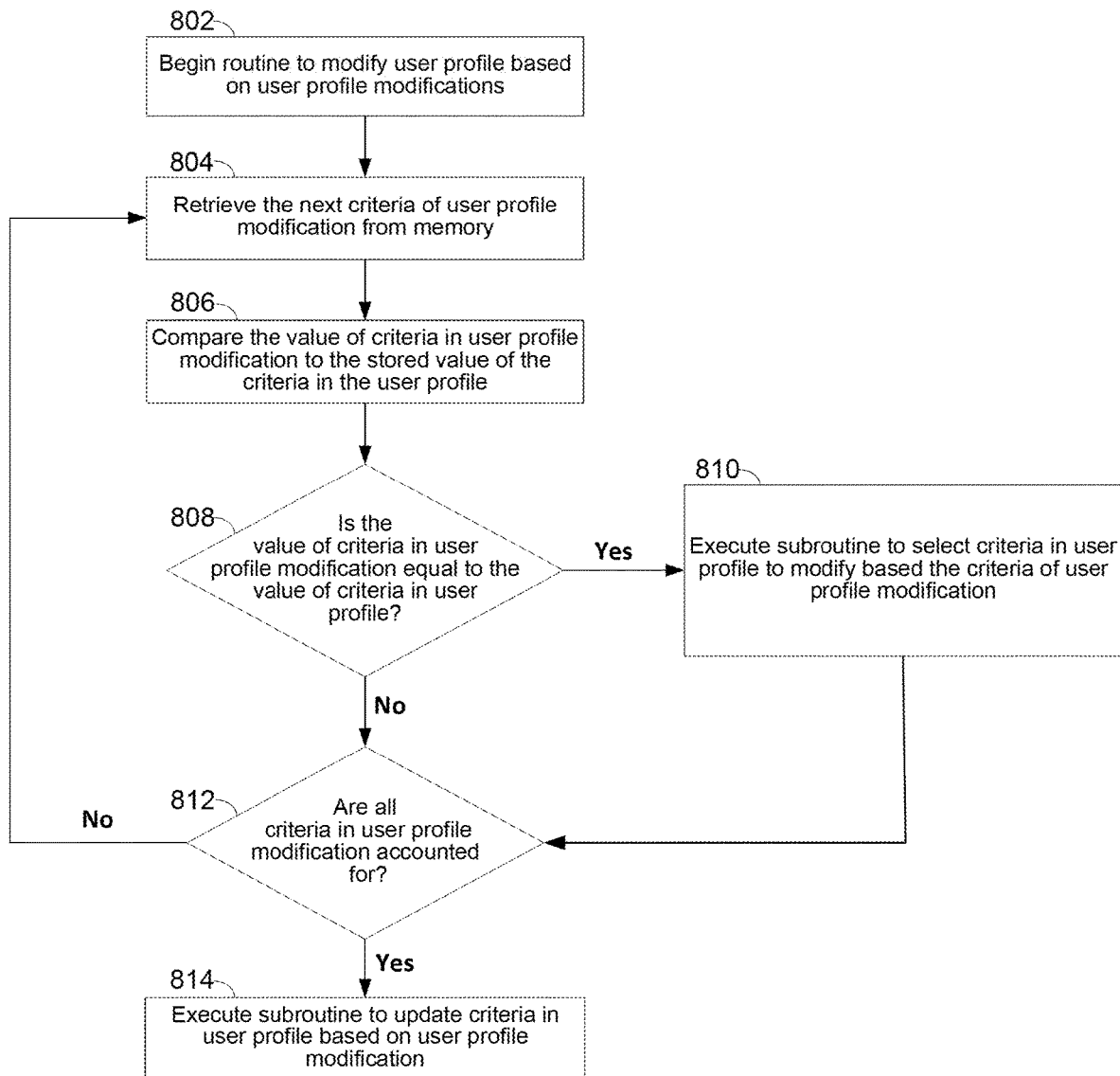
FIG. 8 is a flowchart of illustrative steps for updating criteria in a user profile based on user profile modification in accordance with some embodiments of the disclosure.

FIGS. 8 and 9 present processes for control circuitry (e.g., control circuitry 304) to update criteria in a user profile based on user profile modification in accordance with some embodiments of the disclosure. For example, process 800 may be used to modify user profiles as discussed above in FIGS. 5-7. In some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 8 describes a process implemented on control circuitry (e.g., control circuitry 304) to modify a user profile based on user profile modifications in accordance with some embodiments of the disclosure. For example, in order to implement the user profile modifications described in FIGS. 5-8, the media guidance application (e.g., via control circuitry 304 (FIG. 3)) may implement process 800. Process 800 may involve determining what criteria in a user profile should be modified based on instructions to modify particular criteria in a user profile modification. For example, if the user profile modification includes instructions to update the favorite genre and actor, the media guidance application searches for and locates the current genre and actor in the user profile based on the user profile modification.

At step 802, control circuitry 304 begins a routine to modify a user profile based on user profile modifications. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm their input using a display (e.g., by generating a prompt to be displayed on display 312) prior to running the algorithm.

At step 804, control circuitry 304 proceeds to retrieve the next instance of criteria of the user profile modification. In some embodiments control circuitry 304 may receive a single primitive data structure that represents the value of the next criterion. In some embodiments the value may be stored as part of a larger data structure, and control circuitry 304 may retrieve the value by executing appropriate accessor methods to retrieve the value from the larger data structure.

At step 806, control circuitry 304 proceeds to compare the value of criteria to the stored value of the criteria in the user profile. In some embodiments, the value of criteria may be stored (e.g., on storage device 308) prior to beginning the process. In some embodiments the value of criteria may also be retrieved for each and every instance of criteria in the user profile modification, and the value of criteria in the user profile may change from iteration to iteration. In some embodiments, control circuitry 304 may directly compare the value of criteria in the user profile with the value of criteria in the user profile modification by accessing the values respectively from memory and performing a value comparison. In some instances, control circuitry 304 may call a comparison function (e.g., for object-to-object comparison) to compare criteria in the user profile modification and criteria in the user profile.

At step 808, control circuitry 304 compares the values of the criteria in the user profile modification and criteria in the user profile to determine if the value of the criteria in the user profile modification is equal to the value of the criteria in the user profile (e.g., the criteria are the same). If the condition is satisfied, process 800 proceeds to step 810; if the condition is not satisfied, process 800 proceeds to step 812 instead.

At step 810, control circuitry 304 executes a subroutine to select criteria in the user profile to modify based on the condition at step 808 being satisfied. After the subroutine is executed, process 800 proceed to step 812 where it is determined if all instances of the criteria in the user profile modification are accounted for and further iterations are needed.

At step 814, control circuitry 304 executes a subroutine to update criteria in the user profile based on the user profile modification. For example, control circuitry 304 may modify the selected criteria in the user profile based on the criteria of user profile modification.

It is contemplated that the descriptions of FIG. 8 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 808 and 812, may be performed in any order or in parallel or simultaneously to reduce lag or increase the speed of the system or method. As a further example, in some embodiments several instances of the criteria in the user profile modification may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 3-4 could be used to implement one or more portions of the process.

The pseudocode in FIG. 9 describes a process to modify the user profile based on a user profile modification in accordance with some embodiments of the disclosure. It will be evident to one skilled in the art that the process described by the pseudocode in FIG. 9 may be implemented in any number of programming languages and a variety of different hardware, and that the style and format should not be construed as limiting, but rather a general template of the steps and procedures that would be consistent with code used to implement some embodiments of this disclosure.

At line 901, control circuitry 304 runs a subroutine to initialize variables and prepare to modify a user profile based on user profile modification, which begins on line 905. For example, in some embodiments control circuitry 304 may copy instructions from a non-transitory storage medium (e.g., storage device 308) into RAM or into the cache for processing circuitry 306 during the initialization stage. Additionally, in some embodiments the value of criteria in the user profile modification being used for comparison, or a tolerance level for determining if two values are essentially equivalent, may be retrieved, set, and stored at 901.

At line 905, control circuitry 304 receives instances of criteria in the user profile modification. In some embodiments these instances may be retrieved from memory. Control circuitry 304 may receive instances of criteria in the user profile modification by receiving, for example, a pointer to an array of values of criteria in the user profile modification. In another example, control circuitry 304 may receive an object of a class, such as an iterator object containing elements of criteria in the user profile modification.

At line 906, control circuitry 304 iterates through the various instances of criteria in the user profile modification; if only a single instance is available, the loop will only execute once. This loop may be implemented in multiple fashions depending on the choice of hardware and software language used to implement the algorithm of FIG. 9; for example, this may be implemented as part of a "for" or "while" loop.

At line 907, control circuitry 304 stores the value of criteria in the user profile modification into a temporary variable "A." In some embodiments the value of criteria in the user profile modification will be stored as part of a larger data structure or class, and the value of criteria in the user profile modification may be obtained through appropriate accessor methods. In some embodiments criteria in the user profile modification may be converted from a string or other non-numeric data type into a numeric data type by means of an appropriate hashing algorithm. In some embodiments, control circuitry 304 may call a function to perform a comparison of criteria in the user profile modification to criteria in the user profile. In some embodiments criteria in the user profile modification may be encoded as a primitive data structure, and rather than using a temporary variable, criteria in the user profile modification may be directly used in the comparisons at line 909.

At line 908, control circuitry 304 stores the value of criteria in the user profile into a temporary variable "B." Similar to criteria in the user profile modification, in some embodiments the value of criteria in the user profile will be stored as part of a larger data structure or class, and the value of criteria in the user profile may be obtained through accessor methods. In some embodiments criteria in the user profile may be converted from a string or other non-numeric data type into a numeric data type by means of an appropriate hashing algorithm, or criteria in the user profile may be a primitive data structure, and may be directly used in the comparisons at lines 909 and 611.

At line 909, control circuitry 304 compares the value of criteria in the user profile modification to the value of criteria in the user profile to see if they are essentially equivalent. For example, the media guidance application determines if the value of criteria in the user profile modification and the value of criteria in the user profile both indicate that the respective criteria relate to the same category (e.g., favorite genre, actor, etc.).

At line 910, control circuitry 304 executes a subroutine to update criteria in user profile with criteria in user profile modification.

At line 912, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 600 described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch.

Figure 10:
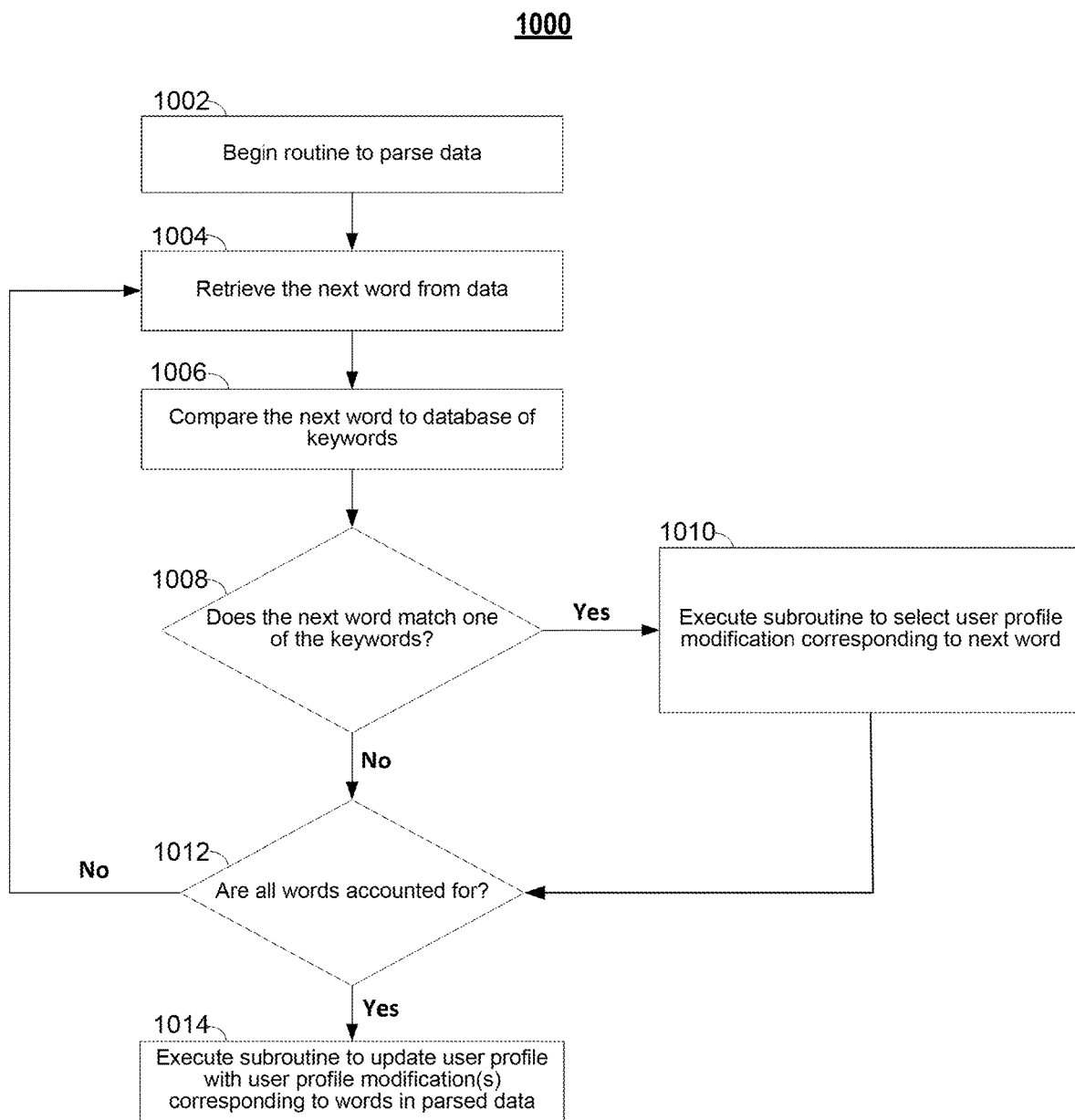
FIG. 10 is a flowchart of illustrative steps for updating a user profile with user profile modification(s) corresponding to words in parsed data in accordance with some embodiments of the disclosure.

FIGS. 10 and 11 present processes implemented on control circuitry (e.g., control circuitry 304) to parse data in accordance with some embodiments of the disclosure. Similar to the algorithms described by FIGS. 8 and 9, in some embodiments this process may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 10 describes a process implemented on control circuitry (e.g., control circuitry 304) to update a user profile with user profile modification(s) corresponding to words in parsed data in accordance with some embodiments of the disclosure. For example, process 800 may be used to update a user profile as discussed in FIGS. 5-7 above.

At step 1002, control circuitry 304 parses data (e.g., words in a social media post). In some embodiments, this may be done either directly or indirectly in response to a user action or input (e.g., from signals received by control circuitry 304 or user input interface 310.)

At step 1004, control circuitry 304 proceeds to retrieve the next word from the data. In some embodiments control circuitry 304 may retrieve a single primitive data structure that represents the value of the next word. In some embodiments control circuitry 304 may retrieve the value from a larger class or data structure.

At step 1006, control circuitry 304 accesses a database containing keywords corresponding the user profile modifications. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At step 1008, control circuitry 304 searches database tables for entries matching the next word. In some embodiments this may be done by comparing an identifier, for example a string or integer representing the next word, that matches the types of identifiers used inside the database. In some embodiments control circuitry 304 may submit a general query to the database for table entries matching the next word, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At step 1010, control circuitry 304 determines if there are database entries matching the next word. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the next word, process 1000 proceeds to step 1010, otherwise process 1000 proceeds to step 1012.

At step 1010, control circuitry 304 executes a subroutine to select user profile modification corresponding to next word. Afterwards, process 1000 proceeds to step 1012 where it is determined if there are more words that need to be accounted for.

At step 1014, control circuitry 304 executes a subroutine for updating a user profile with user profile modification(s) corresponding to words in parsed data. For example, the control circuitry 304 may apply each of the selected user profile modifications corresponding to a word of the parsed data to the user profile.

It is contemplated that the descriptions of FIG. 10 may be used with any other embodiment of this disclosure. In addition, the descriptions described in relation to process 1000 of FIG. 10 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of process 1000.

Furthermore, it should be noted that the process of FIG. 10 may be implemented on a combination of appropriately configured software and hardware, and that any of the devices or equipment discussed in relation to FIGS. 3-4 could be used to implement one or more portions of the algorithm.

The pseudocode in FIG. 11 describes a process to parse data in accordance with some embodiments of the disclosure. It will be evident to one skilled in the art that process 1100 described by the pseudocode in FIG. 11 may be implemented in any number of programming languages and a variety of different hardware, and that the style and format should not be construed as limiting, but rather a general template of the steps and procedures that would be consistent with code used to implement some embodiments of this disclosure.

At line 1101, control circuitry 304 runs a subroutine to initialize variables, which begins on line 1105. For example, in some embodiments control circuitry 304 may copy instructions from a non-transitory storage medium (e.g., storage device 308) into RAM or into the cache for processing circuitry 306 during the initialization stage.

At line 1105, control circuitry 304 receives a next word in the parsed data. In some embodiments these instances may be retrieved from stored memory.

At line 1106, control circuitry 304 iterates through the various words in the data; if only a single instance is available, the loop will only execute once. This loop may be implemented in multiple fashions depending on the choice of hardware and software language used to implement the algorithm of FIG. 11; for example, this may be implemented as part of a "for" or "while" loop, in some programming languages. In some embodiments it may be convenient to store the instances of words in a single class or encapsulated data structure that will perform the loop as part of an internal method.

At line 1107, control circuitry 304 queries a database for entries matching the next word. Depending on how the database is implemented and how the next word is stored, an intermittent step may be required to convert the next word into a form consistent with the database. For example, the next word may be encoded into a string or an integer using an appropriate hashing algorithm prior to being transmitted to the database by control circuitry 304 as part of a query. In some embodiments the next word may be encoded as a primitive data structure, and control circuitry 304 may submit the next word as a query to the database directly. After querying the database, control circuitry 304 may receive a set of database entries matching the next word. In some embodiments control circuitry 304 may receive these entries in the form of a data structure, a set of indices of the database, or a set of indices of another cross-referenced database.

At line 1108, control circuitry 304 will determine if there are any database entries matching the next word. In some embodiments control circuitry 304 may determine this by checking if the database returned an empty data structure or a NULL value in response to the query in line 1107. If there are matching database entries the algorithm may proceed to line 1109. If there are no matching database entries the algorithm may instead proceed to line 1112.

At line 1109, control circuitry 304 retrieves one or more values of keywords corresponding to user profile modifications from the database entries matching the next word. For example, if control circuitry 304 retrieves a list of indices after querying the database in line 1107, in some embodiments control circuitry 304 may retrieve the database entries for keywords corresponding to user profile modifications located at the received indices. In some embodiments the indices may point to a larger data structure contained within the database, and control circuitry 304 may retrieve the values of keywords corresponding to user profile modifications from within the data structure using appropriate accessor methods. In some embodiments control circuitry 304 may retrieve the values of keywords corresponding to user profile modifications and store them in a separate data structure locally (e.g., in storage 308) prior to proceeding further. After retrieving the values of keywords corresponding to user profile modifications the algorithm will proceed to line 810.

At line 1110, control circuitry 304 executes a subroutine to update a user profile with user profile modification.

At line 1112, control circuitry 304 executes a termination subroutine after the algorithm has performed its function and all words in the data have been processed and checked against the database. For example, in some embodiments control circuitry 304 may destruct variables, perform garbage collection, free memory or clear the cache of processing circuitry 306.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of the word and submit multiple database queries simultaneously using a plurality of processors or processor threads. It is also understood that although we may describe control circuitry 304 interacting with a single database, this is only a single embodiment described for illustrative purposes, and the algorithm of FIG. 11 may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

What is claimed is:

1. A method for determining user recovery times to real-life events, the method comprising:
retrieving first social media data indicative of a current real-life event of a user;
parsing the first social media data to identify a keyword corresponding to the current real-life event;
transmitting, via control circuitry, a first query based on the keyword to a database listing event types associated with keywords corresponding to current real-life events;
identifying an event type corresponding to the keyword from the database listing event types associated with keywords corresponding to current real-life events based on a comparison of the keyword to the keywords corresponding to current real-life events;
receiving a user request for a media asset;
transmitting, via the control circuitry, a second query based on the media asset to a database listing event types corresponding to the media asset;
identifying the media asset corresponds to the event type based on a comparison of the event type to the event types corresponding to the media asset;
calculating a time period between the current real-life event and the receipt of the user request;
updating a user profile of the user to indicate the time period corresponds to a recovery period for the type of event;
retrieving second social media data indicative of a subsequent real-life event of the event type of the user;
applying a user profile modification for a duration of the recovery period to the user profile based on the second social media data indicative of the subsequent real-life event of the event type of the user, wherein the user profile modification prevents a recommendation of a media asset which corresponds to the event type for the duration of the recovery period; and
generating for display a media asset recommendation to the user that is based on the user profile modification, wherein the user profile modification prevents displaying of a media asset recommendation corresponding to the event type during the recovery period, and wherein the user profile modification allows displaying of the media asset recommendation corresponding to the event type after the recovery period.

2. The method of claim 1, further comprising:
determining the subsequent real-life event is of the event type;
in response to determining the subsequent real-life event is of the event type, applying a user profile modification to the user profile based on the subsequent real-life event for the recovery period for the type of event.

3. The method of claim 2, further comprising:
identifying a relationship strength of the event type and the keyword based on a relationship strength rating retrieved from the database listing event types associated with keywords corresponding to current real-life events based; and
adjusting a weight of the user profile modification based on the relationship strength of the event type.

4. The method of claim 2, further comprising:
determining whether the current real-life event is a reoccurring real-life event; and
in response to determining that the current real-life event is the reoccurring real-life event, adjusting a weight of the user profile modification based on a frequency of the reoccurring real-life event.

5. The method of claim 4, wherein the weight of the user profile modification is increased as the frequency of the reoccurring real-life event increases.

6. The method of claim 2, wherein the event type is a reduction of free time, and wherein the user profile modification causes a media asset with a shorter play length to be recommended over a media asset with a longer play length.

7. The method of claim 2, wherein the event type is a reduction is schedule flexibility, and wherein the user profile modification causes an on-demand media asset to be recommended over a media asset available at a predetermined time.

8. The method of claim 2, wherein the event type is a reduction is schedule flexibility, and wherein the user profile modification causes a media asset available at a predetermined time to be automatically recorded.

9. The method of claim 2, wherein the user profile includes a first criterion and a second criterion for selecting media assets for presentation to the user, and wherein the first criterion corresponds to a first weight and the second criterion corresponds to a second weight.

10. The method of claim 9, wherein applying the user profile modification to the user profile of the user comprises:
determining the user profile modification corresponds to increasing the first weight corresponding to the first criterion in the user profile; and
increasing the first weight corresponding to the first criterion in the user profile.

11. A system for determining user recovery times to real-life events, the system comprising:
storage circuitry configured to store a database listing event types associated with keywords corresponding to current real-life events; and
control circuitry configured to:
retrieve first social media data indicative of a current real-life event of a user;
parse the first social media data to identify a keyword corresponding to the current real-life event;
transmitting a first query based on the keyword to a database listing event types associated with keywords corresponding to current real-life events;
identify an event type corresponding to the keyword from the database listing event types associated with keywords corresponding to current real-life events based on a comparison of the keyword to the keywords corresponding to current real-life events;
receive a user request for a media asset;
transmit a second query based on the media asset to a database listing event types corresponding to the media asset;
identify the media asset corresponds to the event type based on a comparison of the event type to the event types corresponding to the media asset;
calculate a time period between the current real-life event and the receipt of the user request;
update a user profile of the user to indicate the time period corresponds to a recovery period for the type of event;
retrieve second social media data indicative of a subsequent real-life event of the event type of the user;
apply a user profile modification for a duration of the recovery period to the user profile based on the second social media data indicative of the subsequent real-life event of the event type of the user, wherein the user profile modification prevents a recommendation of a media asset which corresponds to the event type for the duration of the recovery period; and
generate for display a media asset recommendation to the user that is based on the user profile modification, wherein the user profile modification prevents displaying a media asset recommendation corresponding to the event type during the recovery period, and wherein the user profile modification allows displaying a media asset recommendation corresponding to the event type after the duration of the recovery period.

12. The system of claim 11, wherein the control circuitry is further configured to:
determine the subsequent real-life event is of the event type;
in response to determining the subsequent real-life event is of the event type, apply a user profile modification to the user profile based on the subsequent real-life event for the recovery period for the type of event.

13. The system of claim 12, wherein the control circuitry is further configured to:
identify a relationship strength of the event type and the keyword based on a relationship strength rating retrieved from the database listing event types associated with keywords corresponding to current real-life events based; and
adjust a weight of the user profile modification based on the relationship strength of the event type.

14. The system of claim 12, wherein the control circuitry is further configured to:
determine whether the current real-life event is a reoccurring real-life event; and
in response to determining that the current real-life event is the reoccurring real-life event, adjust a weight of the user profile modification based on a frequency of the reoccurring real-life event.

15. The system of claim 14, wherein the weight of the user profile modification is increased as the frequency of the reoccurring real-life event increases.

16. The system of claim 12, wherein the event type is a reduction of free time, and wherein the user profile modification causes a media asset with a shorter play length to be recommended over a media asset with a longer play length.

17. The system of claim 12, wherein the event type is a reduction is schedule flexibility, and wherein the user profile modification causes an on-demand media asset to be recommended over a media asset available at a predetermined time.

18. The system of claim 12, wherein the event type is a reduction is schedule flexibility, and wherein the user profile modification causes a media asset available at a predetermined time to be automatically recorded.

19. The system of claim 12, wherein the user profile includes a first criterion and a second criterion for selecting media assets for presentation to the user, and wherein the first criterion corresponds to a first weight and the second criterion corresponds to a second weight.

20. The system of claim 19, wherein the control circuitry configured to apply the user profile modification to the user profile of the user is further configured to:
determine the user profile modification corresponds to increasing the first weight corresponding to the first criterion in the user profile; and
increase the first weight corresponding to the first criterion in the user profile.

* * * * *